(12) United States Patent
Kato et al.

(10) Patent No.: US 12,288,412 B2
(45) Date of Patent: Apr. 29, 2025

(54) INFORMATION PROCESSING APPARATUS AND INFORMATION PROCESSING METHOD

(71) Applicant: Rakuten Group, Inc., Tokyo (JP)

(72) Inventors: Hajime Kato, Tokyo (JP); Mitsuru Nakazawa, Tokyo (JP); Bjorn Stenger, Tokyo (JP)

(73) Assignee: Rakuten Group, Inc., Tokyo (JP)

( * ) Notice: Subject to any disclaimer, the term of this patent is extended or adjusted under 35 U.S.C. 154(b) by 0 days.

(21) Appl. No.: 17/911,228

(22) PCT Filed: Jun. 1, 2021

(86) PCT No.: PCT/JP2021/020885
§ 371 (c)(1),
(2) Date: Sep. 13, 2022

(87) PCT Pub. No.: WO2022/254584
PCT Pub. Date: Dec. 8, 2022

(65) Prior Publication Data
US 2024/0221415 A1    Jul. 4, 2024

(51) Int. Cl.
*G06K 9/00*      (2022.01)
*G06V 10/82*     (2022.01)
*G06V 30/422*    (2022.01)

(52) U.S. Cl.
CPC ............ *G06V 30/422* (2022.01); *G06V 10/82* (2022.01)

(58) Field of Classification Search
CPC ...... G06V 30/422; G06V 10/82; G06V 10/84; G06V 30/42; G06V 30/414
See application file for complete search history.

(56) References Cited

U.S. PATENT DOCUMENTS 8,799,772 B2 * 8/2014 Megiddo .............. G06V 30/413
                                                    707/709
10,489,126 B2 * 11/2019 Kumar ................. G06V 30/422
(Continued)

FOREIGN PATENT DOCUMENTS

CN   110059687 A *  7/2019  ........... G06V 30/153
CN   112786019 A *  5/2021  ......... G06F 18/2415
(Continued)

OTHER PUBLICATIONS

Siegel et al., "FigureSeer: Parsing Result-Figures in Research Papers", Allen Institute for Artificial Intelligence, University of Washington, 2016, pp. 664-680 (16 pages total).
(Continued)

*Primary Examiner* — Shervin K Nakhjavan
(74) *Attorney, Agent, or Firm* — Sughrue Mion, PLLC

(57) ABSTRACT

Described herein is an information processing apparatus, including: a graph image acquisition unit configured to acquire a graph image; a graph classification unit configured to classify the graph image acquired by the graph image acquisition unit by graph type; a probability map generation unit configured to generate, from the graph image, a probability map that is of a different type by the graph type using a single neural network; a component extraction unit configured to extract a component in the graph image based on the probability map generated by the probability map generation unit; a value extraction unit configured to extract a value of the component of the graph image extracted by the component extraction unit; and an output unit configured to output the value of the component extracted by the value extraction unit.

20 Claims, 15 Drawing Sheets

(56) References Cited

U.S. PATENT DOCUMENTS

| | | | |
|---|---|---|---|
| 11,288,324 B2* | 3/2022 | Shekhar | G06F 16/538 |
| 11,557,107 B2* | 1/2023 | Krishnamoorthy | G06V 30/422 |
| 2003/0048932 A1 | 3/2003 | Zaleski | |
| 2010/0299332 A1* | 11/2010 | Dassas | G06F 16/35 |
| | | | 707/E17.046 |
| 2018/0336405 A1* | 11/2018 | Messina | G06V 10/82 |
| 2022/0358379 A1* | 11/2022 | Jain | G06N 5/022 |
| 2024/0221354 A1* | 7/2024 | Kato | G06V 30/414 |

FOREIGN PATENT DOCUMENTS

| | | |
|---|---|---|
| JP | 2002-328068 A | 11/2002 |
| JP | 2005-503851 A | 2/2005 |

OTHER PUBLICATIONS

Luo et al., "ChartOCR: Data Extraction from Charts Images via a Deep Hybrid Framework", 2021 IEEE Winter Conference on Applications of Computer Vision (WACV), 2021, pp. 1916-1924 (9 pgs total).

Jung et al., "ChartSense: Interactive Data Extraction from Chart Images", Data Extraction, 2017, pp. 6706-6717 (12 pgs total).

* cited by examiner

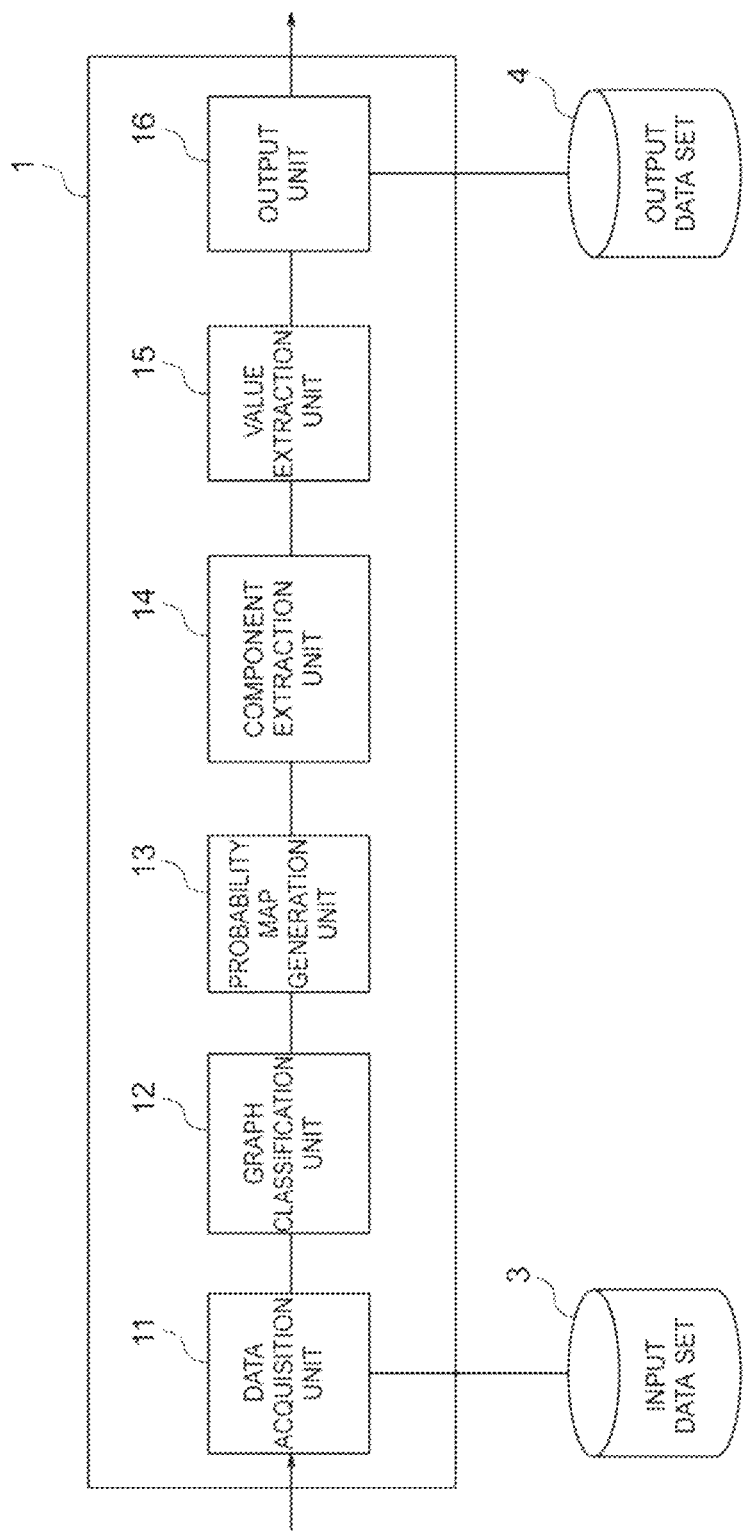

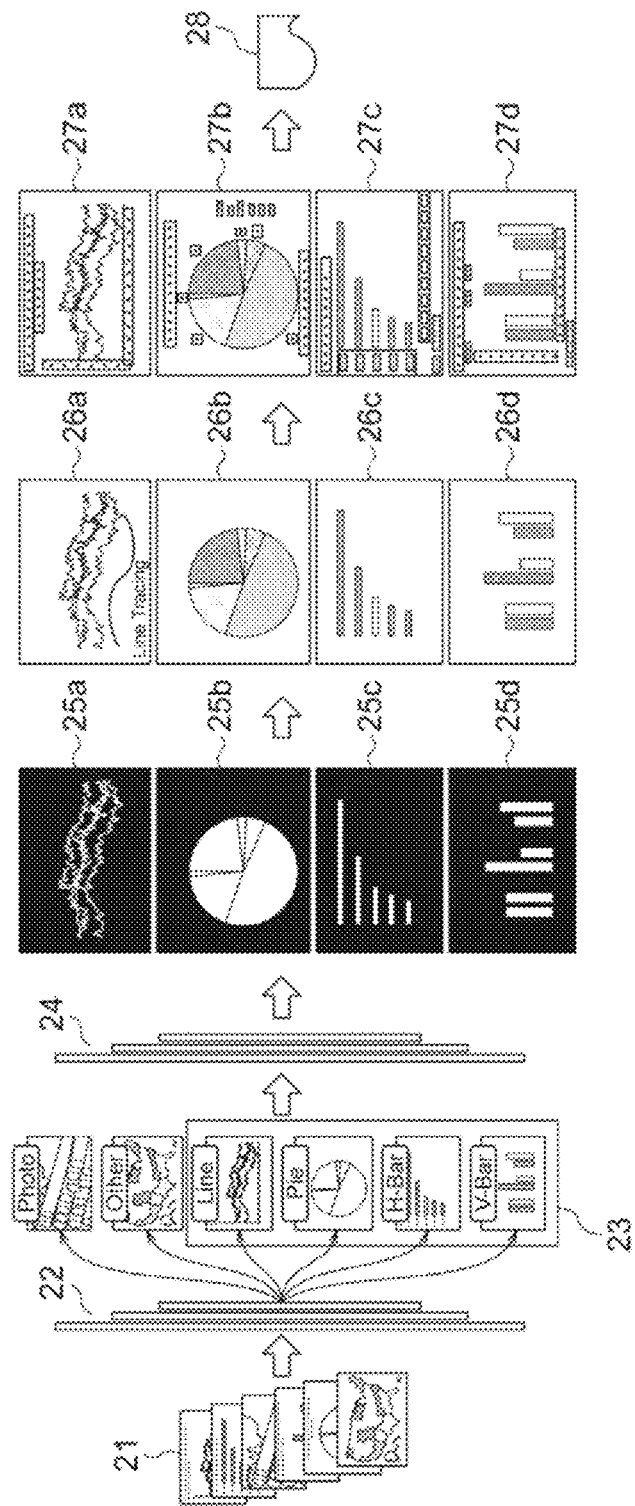

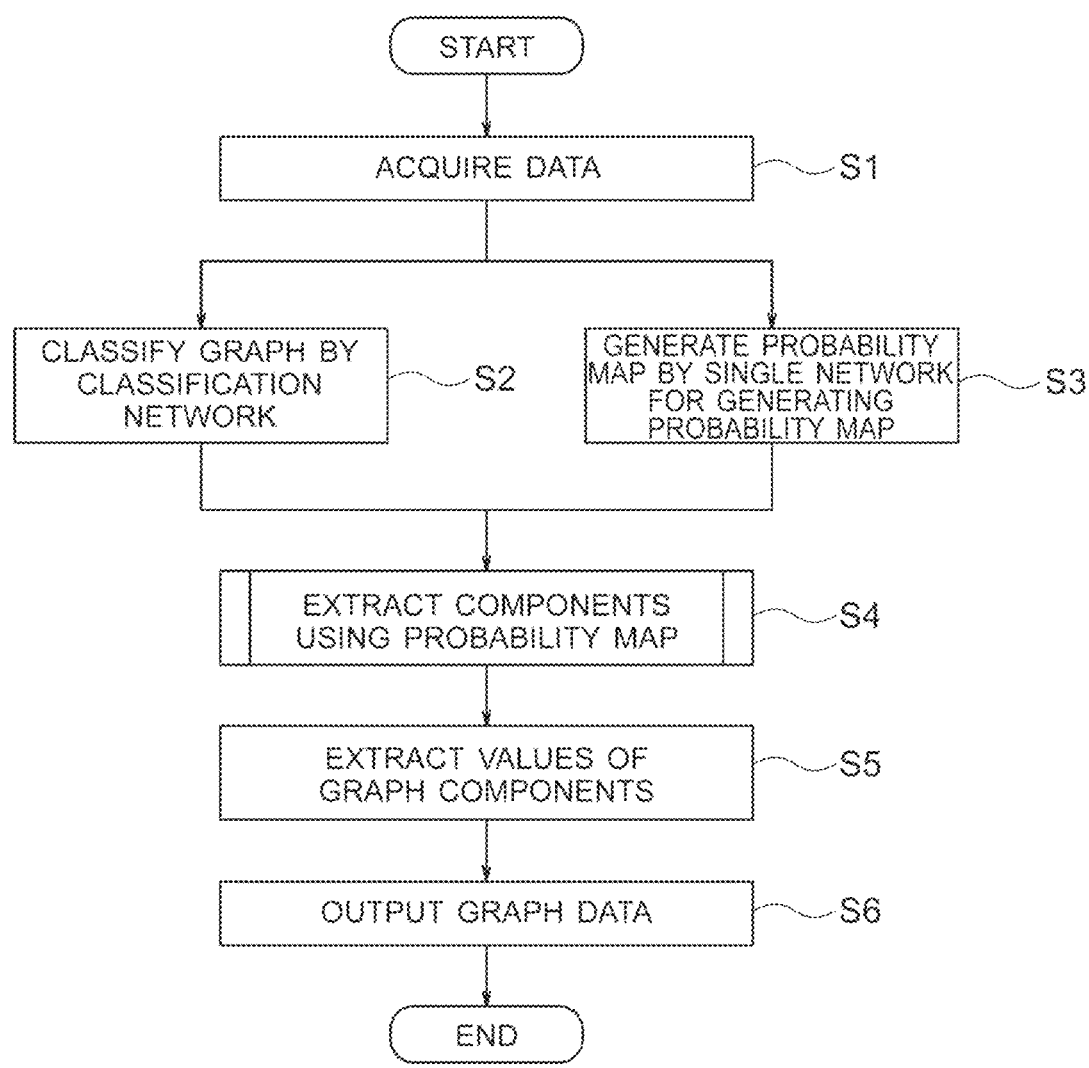

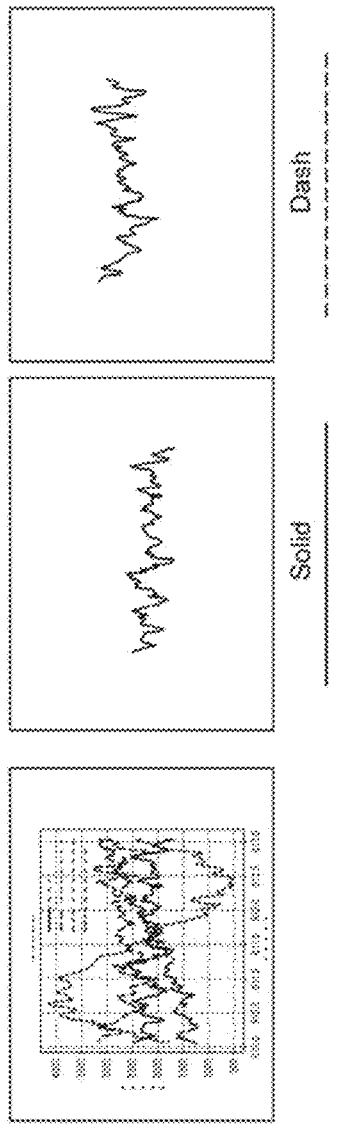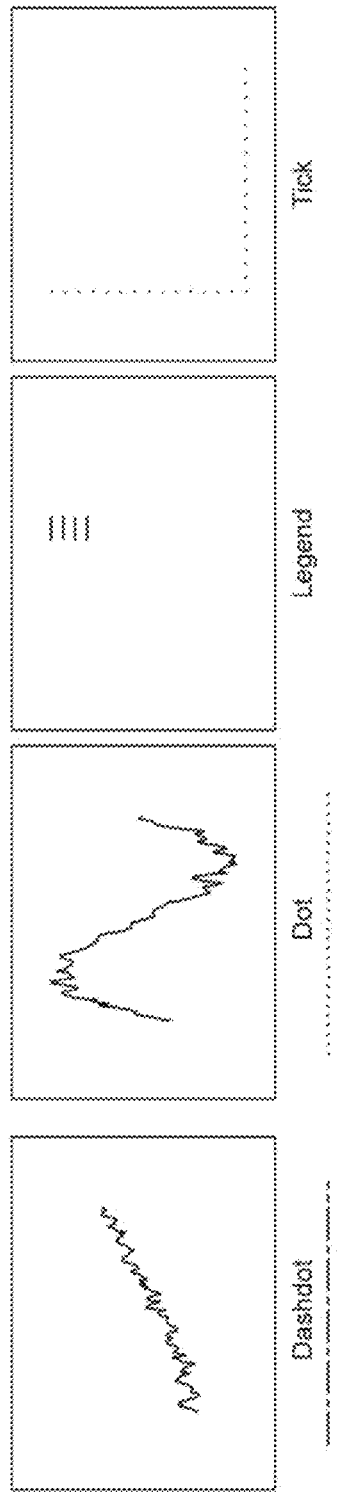

INFORMATION PROCESSING APPARATUS AND INFORMATION PROCESSING METHOD

CROSS REFERENCE TO RELATED APPLICATION

This application is a National Stage of International Application No. PCT/JP2021/020885 filed Jun. 1, 2021.

TECHNICAL FIELD

The present invention relates to an information processing apparatus, an information processing method and a program thereof, and more particularly, to a technique for analyzing images of graphs.

BACKGROUND ART

Conventionally, a technique for converting images including line graphs to digital data has been known.

For example, Patent Literature 1 discloses a processing system for image display data that analyzes a line graph display of collected patient data, identifies individual pixels, and generates a plurality of pixel display data elements that identify the relative positions of individual pixels with respect to a reference point in a desired data format and stores the generated pixel display data elements in a file.

Patent Literature 2 discloses a vibration data digitizing apparatus that reads non-digital vibration waveforms recorded on paper or other media with a scanner, reads amplitude data at each set pitch for each of the read graph images, and converts the amplitude data into digital data that can be used by a vibrating table.

Non-Patent Literature 1 discloses a technique for analyzing line graphs by extracting figures and tables from PDF files of research papers, separating line graphs from the extracted figures and tables, and detecting axes and legends of the line graphs.

LISTING OF REFERENCES

Patent Literature

PATENT LITERATURE 1: Japanese Translation of PCT International Application Publication No. JP-T-2005-503851
PATENT LITERATURE 2: Laid-open Publication of Japanese Patent Application No. 2002-328068 A
NON-PATENT LITERATURE 1: Siegel, N., Horvitz, Z., Levin, R., and Levin, R., Divvala, S., Farhadi, A., "FigureSeer: Parsing Result—Figures in Research Papers" ECCV (2016) pp. 664-680

SUMMARY OF THE INVENTION

Problems to be Solved by the Invention

However, while there are various types of graphs, including line graphs, bar graphs, and pie charts, the techniques of the above mentioned prior art documents are limited to analyzing only line graphs and are not capable of analyzing other types of graphs, thereby making it less versatile.

In addition, in the techniques disclosed in the Patent Literature 1 and 2, when tracing a line graph, a user is required to specify the graph color and luminance amplitude, or set the X-axis, Y-axis, and scale, which imposes an excessive burden on the user when trying to analyze a large number of graph images.

On the other hand, the technique disclosed in the Non-Patent Literature 1 traces a line graph by detecting a legend positioned outside the columns of the line graph and detecting the line type of the symbols described in the detected legend, thus the Non-Patent Literature 1 is not intended to analyze a line graph image that does not include a legend.

The present invention has been made in order to solve the above mentioned problems and an object thereof is to provide an information processing apparatus, an information processing method and a program thereof that are capable of analyzing images of more diverse graphs more universally with higher accuracy.

Solution to Problems

In order to solve the above mentioned problems, according to one aspect of the present invention, there is provided an information processing apparatus, comprising: a graph image acquisition unit configured to acquire a graph image; a graph classification unit configured to classify the graph image acquired by the graph image acquisition unit by graph type; a probability map generation unit configured to generate, from the graph image, a probability map that is of a different type by the graph type using a single neural network; a component extraction unit configured to extract a component in the graph image based on the probability map generated by the probability map generation unit; a value extraction unit configured to extract a value of the component of the graph image extracted by the component extraction unit; and an output unit configured to output the value of the component extracted by the value extraction unit.

The single neural network used by the probability map generation unit may have output channels different from each other by the graph type.

The single neural network used by the probability map generation unit may have output channels of a plurality of different types for separating different components for each of graph types.

The component extraction unit may extract the component and traces a graph.

The output unit may output the graph traced by the component extraction unit with the value of the component, which is extracted by the value extraction unit, being appended to the graph.

The component extraction unit may simultaneously trace a plurality of components in the graph image.

The component extraction unit may calculate, using a first probability map for a line graph, a first cost between adjacent X-coordinate positions of a graph image of the line graph, and trace the line graph such that a sum of the first costs for a plurality of line graphs is minimized.

The component extraction unit may use a Linear Programming (LP) to calculate the first cost of the line graph to be traced.

The component extraction unit may have an occlusion flag indicating whether or not the line graph to be traced is occluded by another line graph at each of X-coordinate positions, and calculate the first cost of the line graph to be traced using the occlusion flag.

The occlusion flag may be provided for each of a plurality of line graphs and hold a status of each of the plurality of line graphs at each of the X-coordinate positions.

The component extraction unit may detect a start point and an end point of the line graph by adding up existence probabilities of the line graph in a Y-coordinate axis direction at each of the X-coordinate positions using the first type of probability map, and trace the line graph from the detected start point to the detected end point.

The component extraction unit may trace the graph by concatenating adjacent pixels using a second type of probability map for a graph other than a line graph.

The component extraction unit may use a Connected Component Analysis (CCA) to concatenate adjacent pixels in a graph image of the graph.

The component extraction unit may correct the extracted components by referring to the second type of probability map.

The component extraction unit may use a first type of probability map for a line graph to calculates a second cost of each pixel in a graph image of the line graph, and trace the line graph on a pixel where a sum of the second costs for a plurality of line graphs is minimized.

The component extraction unit may use a Dynamic Programming (DP) to calculate the second cost of each pixel of the graph image of the line graph.

The component extraction unit may calculate the second cost based on a function that evaluates at least one of smoothness of a line of the line graph and consistency of a line color or a line type of the line graph.

The probability map generation unit may generate a probability map for extracting tick-marks of graph axes, and the value output unit may extract the value of the component of the graph image based on the probability map for extracting the tick-marks of the graph axes.

According to another aspect of the present invention, there is provided an information processing method executed by an information processing apparatus, comprising steps of: acquiring a graph image; classifying the graph image by graph type: generating, from the graph image, a probability map that is of a different type by the graph type using a single neural network; extracting a component in the graph image based on the probability map; extracting a value of the component of the graph image: and outputting the value of the component.

According to yet another aspect of the present invention, there is provided an information processing program for causing a computer to execute information processing, the program causing the computer to execute processing comprising: a graph image acquisition process for acquiring a graph image: a graph classification process for classifying the graph image acquired by the graph image acquisition process by graph type; a probability map generation process for generating, from the graph image, a probability map that is of a different type by the graph type using a single neural network; a component extraction process for extracting a component in the graph image based on the probability map generated by the probability map generation process: a value extraction process for extracting a value of the component of the graph image extracted by the component extraction process; and an output process for outputting the value of the component extracted by the value extraction process.

Advantageous Effect of the Invention

According to the present invention, it makes it possible to analyze images of more diverse graphs more universally with higher accuracy.

The above mentioned and other not explicitly mentioned objects, aspects and advantages of the present invention will become apparent to those skilled in the art from the following embodiments (detailed description) of the invention by referring to the accompanying drawings and the appended claims.

BRIEF DESCRIPTION OF DRAWINGS

FIG. 1 is a block diagram illustrating an exemplary functional configuration of a graph image analysis apparatus according to respective embodiments of the present invention.

FIG. 2 is a conceptual diagram illustrating an exemplary outline of graph image analysis processing performed by the graph image analysis apparatus according to the embodiments.

FIG. 3 is a flowchart illustrating an exemplary processing procedure of the graph image analysis processing performed by the graph image analysis apparatus according to the embodiments.

FIGS. 6A to 6G are schematic diagrams each illustrating exemplary outputs of output channels of the neural network, which are output for a line graph by the probability map generation unit of the graph image analysis apparatus.

DESCRIPTION OF EMBODIMENTS

Figure 4A:
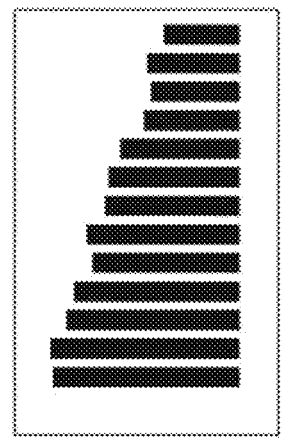
FIGS. 4A to 4F are schematic diagrams each illustrating exemplary outputs of output channels of a neural network, which are output for a bar graph by a probability map generation unit of the graph image analysis apparatus.

Hereinafter, embodiments of the present invention will be described in detail with reference to the accompanying drawings. Among the constituent elements disclosed herein, those having the same function are denoted by the same reference numerals, and a description thereof is omitted. It should be noted that the embodiments disclosed herein are illustrative examples as means for implementing the present invention, and should be appropriately modified or changed depending on a configuration and various conditions of an apparatus to which the present invention is applied, and the present invention is not limited to the following embodiments. Furthermore, it should be noted that all of the combinations of features described in the following embodiments are not necessarily essential to the solution of the present invention.

First Embodiment

A graph image analysis apparatus according to the present embodiment classifies an input graph image by graph type, generates a probability map that is of a different type by the graph type, and automatically analyzes the graph image using the generated probability map.

Hereinafter, a certain example will be described in which the graph image analysis apparatus classifies an input graph image into any one of a bar graph type, a pie chart type, and a line graph type, generates a probability map for any one of those graph types, and uses the generated probability map to analyze the graph image of each of graph types.

However, the present embodiment is not limited thereto. For example, the graph image analysis apparatus may classify and analyze any types of graph images, such as flowcharts, radar charts, scatter plots, Venn diagrams, and the like.

It should be noted that, according to the present embodiment, a graph image is meant to be an image that includes a graph (e.g., a diagram, a figure, or a chart, hereinafter collectively referred to as a "graph") in whole or in part of the image. Graph images may be input to the graph image analysis apparatus in any arbitrary format.

<Functional Configuration of Graph Image Analysis Apparatus>

FIG. 1 is a block diagram illustrating an exemplary functional configuration of the graph image analysis apparatus 1.

Graph image analysis apparatus 1 illustrated in FIG. 1 includes a data acquisition unit 11, a graph classification unit 12, a probability map generation unit 13, a component extraction unit 14, a value extraction unit 15, and an output unit 16.

The data acquisition unit 11 acquires input data from an input data set 3 and supplies the acquired input data to the graph classification unit 12. The input data acquired by the data acquisition unit 11 may include graph images. The input data set 3 is constituted with a non-volatile storage device and may be provided locally or remotely connected to the graph image analysis apparatus 1.

Graph images may be in any image file format, such as a bitmap, a GIF (Graphics Interchange Format), a JPEG (Joint Photographic Experts Group), a TIFF (Tag Image File Format), and the like. When a graph is included as a part of an image, the image may be in any image file format, such as a PDF (Portable Document Format), or an HTML (Hyper Text Markup Language) that constitutes a web page.

The data acquisition unit 11 may receive input data from an opposing device via a communication I/F instead of the input data set 3.

The data acquisition unit 11 may also accept input of various parameters necessary to perform graph image analysis processing performed by the graph image analysis apparatus 1.

The graph classification unit 12 extracts a graph image to be analyzed at a subsequent stage from the input data supplied by the data acquisition unit 11, classifies the extracted graph image into one of a plurality of graph types, and supplies the classified graph image to the probability map generation unit 13. The graph classification unit 12 may extract, as a graph image to be analyzed, a bar graph, a pie chart, a line graph, and the like, from the input data.

According to the present embodiment, the graph classification unit 12 may extract graph images from input data and classify the extracted graph images using, for example, a neural network or other network for classification.

The probability map generation unit 13 generates a probability map for the classified graph image supplied by the graph classification unit 12 for each classified graph type, and supplies the generated probability map to the component extraction unit 14. The probability map generation unit 13 may also generate a probability map for the graph image for each graph type, using the graph image before being classified by the graph classification unit 12 as input.

According to the present embodiment, a probability map generated by the probability map generation unit 13 is a map constituted with an estimated probability distribution, which is calculated by estimating, for each pixel of a graph image, the probability that a component constituting a graph of a classified type will appear.

The probability map generation unit 13 may generate probability maps from the classified graph images using, for example, a neural network or other network for generating the probability maps. The network for generating probability maps used by the probability map generation unit 13 may be a single segmentation network (i.e., segmentation model) that outputs probability maps for multiple types of graphs, or alternatively, may be multiple segmentation networks (i.e., segmentation models) provided for multiple types of graphs, respectively.

The probability map generation unit 13 may also generate different types of probability maps by the classified graph type, respectively, which will be described below with reference to FIG. 2, and furthermore, may generate different types of probability maps for each of classified graph types, which will be described below with reference to FIGS. 4 and 6.

The component extraction unit 14 extracts components that constitute the graph (hereinafter simply referred to as "components") from the graph image using the probability map supplied by the probability map generation unit 13.

More particularly, the component extraction unit 14 uses, with respect to the graph image classified by the graph classification unit 13, the probability map corresponding to the graph type to which the graph image concerned is classified, which is supplied from the probability map generation unit 13, to separate each of the multiple components that constitute the graph from the graph image.

The component extraction unit 14 may separate, from the graph image, major or dominant components, respectively, among a plurality of components that constitute the graph. Multiple types of probability maps may be generated for multiple dominant components to be separated, respectively.

The component extraction unit 14 traces a graph for each of the multiple components separated from the graph image and supplies the separated components and the graph thereof to the value extraction unit 15.

The value extraction unit 15 extracts the corresponding graph value for each of components of the graph image supplied by the component extraction unit 14.

More particularly, the value extraction unit 15 extracts labels for the axes of the graph image and labels assigned to respective components, and generates graph values corresponding to respective components of the graph image based on the text of the extracted labels and geometric arrangement thereof.

The value extraction unit 15 may also generate graph values corresponding to respective components of the graph image based on the probability map of tick-marks of the graph axes.

Although the graph itself included in a graph image is a visualization of the given input data, the original input data on which the graph drawing is based is usually not directly accessible from the imaged graph image.

According to the present embodiment, the value extraction unit 15 restores the original input data on which the graph drawing was based by generating graph values corresponding to respective components of the graph image.

The value extraction unit 15 may generate graph values continuously for successive pixels of each component of the graph image, or alternatively, may generate graph values discretely at each predetermined pixel interval.

The value extraction unit 15 appends or maps the generated graph values to respective components of the graph image, respectively, and supplies the respective components with the graph values to the output unit 16.

The output unit 16 synthesizes respective components of the graph image extracted by component extraction unit 14 into a graph and outputs the synthesized graph as digital data into the output data set 4. The graph output to the output data set 4 may be output externally in a push or pull type through a user interface of the graph image analysis apparatus 1 or other devices.

Each of components of the graph, which is synthesized by the output unit 16, has a graph value appended thereto, which is extracted by the value extraction unit 15. For this reason, the graph image analysis apparatus 1 or other devices is able to read the data of the synthesized graph from the output data set 4 as a post-processing step of the graph image analysis processing, and process and output the data as desired.

For example, the output unit 16 or the post-processing may output another graph by changing the graph type to be different from the original graph type classified by the graph classification unit 12, or by changing the scale, the graphing range, the color, the line type or the like, of the graph components.

It should be noted that the output unit 16 may output the graph values generated by the value extraction unit 15 independently, without appending the graph values to respective components of the graph image. Alternatively, the output unit 16 may format those graph values into any desired format, such as a table format, and output the formatted graph values.

It should be noted that the graph image analysis apparatus 1 may be connected to a client device, such as a PC (Personal Computer), to enable communication therebetween. The client device may provide a user interface for the graph image analysis apparatus 1 to input and output information to and from the outside, and may also be equipped with some or all of the components 11 to 16 of graph image analysis apparatus 1.

FIG. 2 is a conceptual diagram illustrating outlines of the graph image analysis processing performed by the graph image analysis apparatus 1 according to the present embodiment.

According to the present embodiment, graph image analysis apparatus 1 extracts graph images to be analyzed from the input data and classifies the extracted graph images into one of multiple graph types.

Referring to FIG. 2, input data 21 is input to a network 22 for classification, which is constituted with a neural network or the like, and the network 22 for classification outputs classification results 23 that include a graph image classified into one of the multiple graph types. The classification results 23 output by the network 22 for classification include a graph image of any of a line graph (Line), a pie chart (Pie), a horizontal bar graph (H-Bar), and a vertical bar graph (V-Bar). The network 22 for classification is pre-trained with data of various graph images and labels of graph types as training data.

Each of those classified graph images may be input to the network 24 for generating probability maps, which is provided at a subsequent stage. On the other hand, although the network 22 for classification also outputs graph images having types other than the graph image to be analyzed (e.g., graphs of maps) and photographs as classification results, those classification results are not input to the network 24 for generating probability maps, which is provided at a subsequent stage.

According to the present embodiment, the graph image analysis apparatus 1 generates different types of probability maps for respective classified graph types, separates graph image components from the graph image using the generated probability maps, traces the graph with the separated graph image components and extracts graph values corresponding to the traced graph components.

Referring to FIG. 2, the classification results 23, in other words, the data of the classified graph image, are input to the network 24 for generating probability maps, which is constituted with a neural network or the like. The network 24 for generating probability maps outputs probability maps 25a to 25d for classified graph image types, respectively.

In FIG. 2, the probability maps output by the network 24 for generating probability maps include: a probability map 25a for line graphs, a probability map 25b for pie charts, a probability map 25c for horizontal bar charts, and a probability map 25d for vertical bar charts. The details of the configuration of the probability maps will be described below with reference to FIGS. 4A to 6G.

The network 24 for generating probability maps is pre-trained using, as training data, data of graph images to which the classified graph types are appended and labels corresponding to the graph types, such as color, borderline, segmentation, legend, tick-marks of graph axes, line type, and the like.

It should be noted that any of the network 22 for classification and the network 24 for generating probability maps may be the CNN (Convolutional Neural Networks) or other neural networks, or alternatively, may use other machine learning models such as the SVM (Support Vector Machine).

Alternatively, the graph image analysis apparatus 1 may perform classification of graph images and generation of probability maps in parallel using the network 22 for classification and the network 24 for generating probability maps together. In other words, the graph image analysis apparatus 1 may input a graph image extracted from the input data 21 to the network 22 for classification to classify the input graph image into one of multiple graph types. In parallel, the graph image analysis apparatus 1 may input the graph image extracted from the input data 21 to the network 24 for generating probability maps to output the probability maps 25a to 25d for the graph types different each other, respectively.

In this case, the network 24 for generating probability maps may be a single integrated segmentation network (i.e., segmentation model) that is equipped with a plurality of output channels corresponding to multiple types of graph components, respectively, to output probability maps for all types of graphs.

However, the graph image analysis apparatus 1 may use the graph images classified by the network 22 for classification as input, and, as a subsequent stage of the graph classification process, perform the probability map generating process using the single network 24 for generating probability maps.

By using a single network 24 for generating probability maps with multiple output channels corresponding to multiple types of graphs, it makes it possible to train the network 24 for generating probability maps, which is constituted with the segmentation model, more efficiently while reducing the computational load. In addition, by using such a single network 24 for generating probability maps, it makes it possible to simultaneously input multiple types of graph images to the segmentation model during the inference phase to perform inference universally. Furthermore, by running training and inference in parallel with the network 24 for generating probability maps and the network 22 for classification, it makes it possible to analyze graph images at a higher speed.

In the probability maps 25a to 25d in FIG. 2, pixels of which likelihood that a dominant or major component of the graph image appears is greater than or equal to the predetermined threshold are denoted in white on black background. A probability map 25a for a line graph separates the components of each line graph. A probability map 25b for a pie chart separates the components of respective pie slices of each pie chart. A probability maps 25c and 25d for horizontal and vertical bar graphs separate the components of respective bar segments of each bar graph, respectively.

According to the present embodiment, different types of probability maps 25a to 25d by the graph type are used to separate and extract respective components from the graph images. Referring to FIG. 2, for a graph image of a line graph, the probability map 25a for the line graph is used to extract and trace respective line graph components 26a. For a graph image of a pie chart, the probability map 25b for the pie chart is used to extract and trace respective pie slice component 26b. Likewise, for graph images of horizontal and vertical bar graphs, the probability maps 25c and 25d for the horizontal and vertical bar graphs, respectively, are used to extract and trace respective bar segment components 26c and 26d, respectively.

A graph value is extracted for each of the components 26a to 26d extracted from a graph image. More particularly, a text string is detected and character-recognized from the regions of line graph, pie chart, horizontal bar graph, and vertical bar graph images, such as labels of the coordinate axes, labels appended to respective components, titles, legends, and the like, as indicated by the rectangular regions in the graph images 27a to 27d. Based on the results of the character recognition and the geometric arrangement of respective components extracted on the graph image, graph values are generated. The generated graph values are appended to respective components of the traced graph, respectively, so as to output the digitized graph data 28.

<Processing Procedure of Graph Image Analysis Processing>

FIG. 3 is a flowchart illustrating an exemplary processing procedure of graph image analysis processing performed by the graph image analysis apparatus 1 according to the present embodiment. In the example shown in FIG. 3, the graph image analysis apparatus 1 uses a single network for generating probability maps to concurrently perform classification of graph images by the graph classification unit 12 and generation of probability maps by the probability map generation unit 13.

It should be noted that each step shown in FIG. 3 may be performed by the CPU reading and executing a program stored in the storage device such as an HDD of the graph image analysis apparatus 1. Alternatively, at least a part of the flowchart shown in FIG. 3 may be carried out by a hardware. When implemented by the hardware, for example, by using a predetermined compiler, a dedicated circuit may be automatically generated on a Field Programmable Gate Array (FPGA) from programs for implementing the respective steps. Furthermore, a gate array circuitry may be formed in the same manner as the FPGA and implemented as the hardware. Yet furthermore, it may be implemented by an Application Specific Integrated Circuit (ASIC).

In step S1, the data acquisition unit 11 of the graph image analysis apparatus 1 acquires input data including a graph image from the input data set 3.

In step S2, the graph classification unit 12 of the graph image analysis apparatus 1 uses the 22 networks for classification to extract the graph image to be analyzed from the input data, and classifies the extracted graph image into one of the multiple graph types, which are subject to the analysis.

In parallel to step S2, in step S3, the probability map generation unit 13 of the graph image analysis apparatus 1 uses the single network 24 for generating probability maps to generate a probability map for extracting respective components from the graph image extracted from the input data input in step S1 for each of graph types.

The single network 24 for generating probability maps used by the probability map generation unit 13 in step S3 has, as described above, multiple output channels corresponding to multiple types of graph components, respectively, and is a single integrated segmentation network (i.e., segmentation model) capable of generating probability maps for all types of graphs.

It should be noted that, although the network 24 for generating probability maps may be formed as a learning model that have been already trained with different training data for each graph type to be analyzed, alternatively, the network 24 for generating probability maps may differ for each graph type only in the output channels of the network, and the networks other than the output channels may have a common structure. This improves the versatility of the network 24 for generating probability maps. Hereafter, the term "network for generating probability maps" is meant to include both such a single network and networks for respective graph types.

FIGS. 4A to 4F are schematic diagrams illustrating exemplary output channels of the network 24 for generating probability maps, which generates a probability map for extracting each component from a graph image of a vertical bar graph.

Figure 4B:
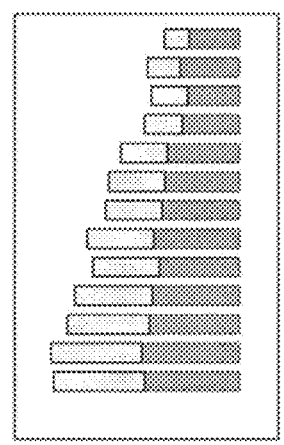
Figure 4C:
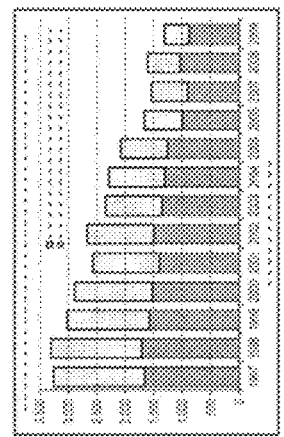
Figure 4D:
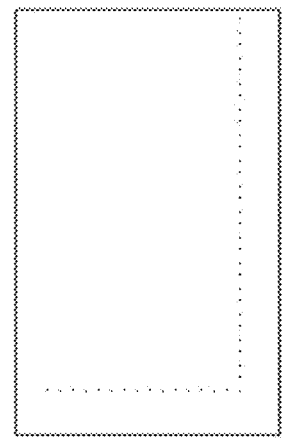
Figure 4E:
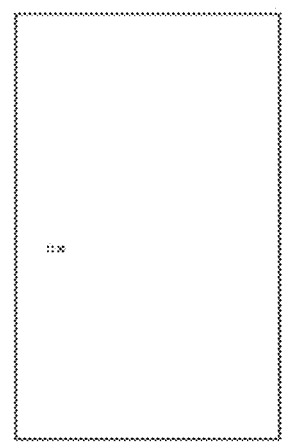
Figure 4F:
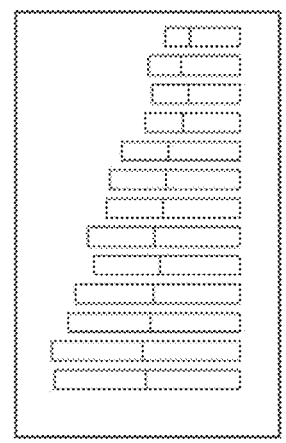

Assuming that a graph image of the vertical bar graph shown in FIG. 4A is used as input data, the network 24 for generating probability maps includes an output channel of the color (i.e., dominant color) that colors bar segments shown in FIG. 4B, an output channel of the segmentation that segments the bar graph into each bar segment shown in FIG. 4C, and an output channel of the borderline that defines the boundary of each bar segment shown in FIG. 4D. The network 24 for generating probability maps may further include an output channel of the legend shown in FIG. 4E and an output channel of the tick-mark of graph axes shown in FIG. 4F. The probability map generation unit 13 generates multiple types of probability maps that correspond to FIGS. 4B to 4F, respectively.

FIGS. 5A to 5F are schematic diagrams illustrating exemplary output channels of the network 24 for generating probability maps, which generates a probability map for extracting each component from a graph image of a pie chart.

Figure 5A:
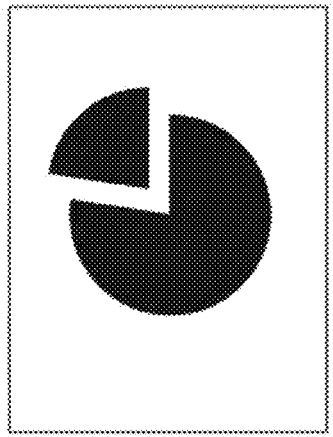
FIGS. 5A to 5F are schematic diagrams each illustrating exemplary outputs of output channels of the neural network, which are output for a pie chart by the probability map generation unit of the graph image analysis apparatus.
Figure 5B:
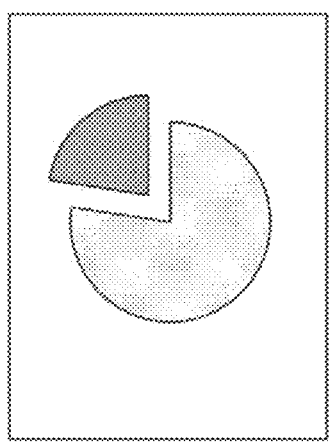
Figure 5C:
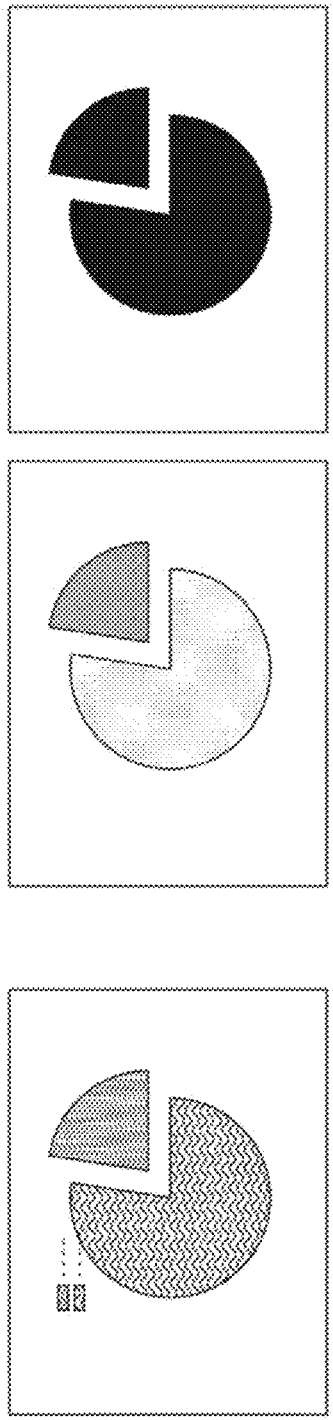
Figure 5D:
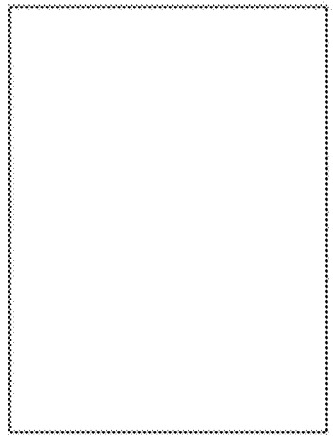
Figure 5E:
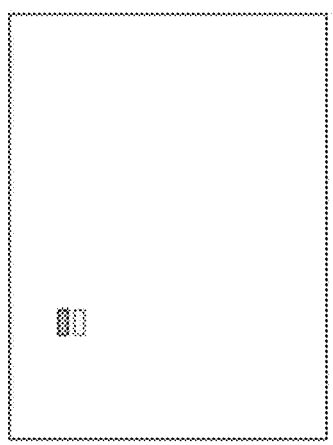
Figure 5F:
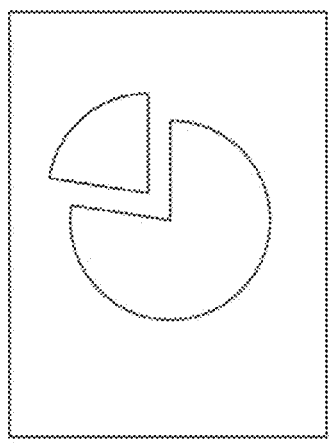

Assuming that a graphical image of the pie chart shown in FIG. 5A is used as input data, the network 24 for generating the probability maps includes an output channel of the color (i.e., dominant color) that colors pie slices shown in FIG. 5B, an output channel of the segmentation that segments the pie chart into each pie slice shown in FIG. 5C, and an output channel of the borderline that defines the boundary of each pie slice shown in FIG. 5D. The network 24 for generating probability maps may further include an output channel of the legend shown in FIG. 5E and an output channel of the tick-mark of graph axes shown in FIG. 5F. The probability map generation unit 13 generates multiple types of probability maps that correspond to FIGS. 5B to 5F, respectively. It should be noted that, since graph axes are not usually assigned to a pie chart, the probability map of the tick-mark of graph axes extracted from the graph image of the pie chart may have an all-zero value, as shown in FIG. 5F.

On the other hand. FIGS. 6A to 6G are schematic diagrams illustrating exemplary output channels of the network 24 for generating probability maps, which generates a probability map for extracting each component from a graph image of a line graph.

Assuming that a graph image of the line graph shown in FIG. 6A is used as input data, the network 24 for generating probability maps includes, by line type, an output channel of the solid line graph shown in FIG. 6B, an output channel of the dashed line graph shown in FIG. 6C, an output channel of the dashed-dotted line graph shown in FIG. 6D, and an output channel of the dotted line graph shown in FIG. 6E. The network 24 for generating probability maps may further include an output channel of the legend shown in FIG. 6F and an output channel of the tick-mark of graph axes shown in FIG. 6G. The probability map generation unit 13 generates multiple types of probability maps that correspond to FIGS. 6B to 6G, respectively.

When constituting the network 24 for generating probability maps with a single segmentation model for all graph types including the bar graph, the pie chart, and the line graph, the network 24 for generating probability maps may have eleven output channels, that is, three channels for RGB colors, respectively, one channel for segmentation (i.e., foreground), one channel for borderline, four channels for four line types, one channel for legend, and one channel for tick-mark of graph axes.

By generating a probability map of the tick-mark of graph axes, when extracting values of respective components of the graph, it makes it possible to identify graph values indicated by respective tick-marks on the graph axis more directly and accurately, without need to estimate the graph values from coordinate information of OCR-recognized text boxes.

It should be noted that the configuration of the output channels and the probability maps of the network 24 for generating probability maps shown in FIGS. 4A to 6G, respectively, is no more than an example, and the present embodiment is not limited thereto. For example, although the output channels (probability maps) for extracting legends from a graph image, as shown in FIGS. 4E, 5E, and 6F, may be used to mask regions of the legends to define regions where the graph is drawn from the graph image, the output channels for extracting legends may not necessarily be generated. Likewise, although the output channels (probability maps) for extracting tick-marks of graph axes from a graph image, as shown in FIGS. 4F, 5F, and 6G, may be used to extract a value corresponding to each component of the graph more accurately, the output channels for extracting tick-marks may not necessarily be generated. The probability map generation unit 13 may generate multiple types of probability maps different from each other depending on the graph type so as to facilitate tracing of graph components.

Referring back to FIG. 3, the component extraction unit 14 of the graph image analysis apparatus 1 estimates each of components of a graph from the graph image using the probability map generated corresponding to each graph type in step S3, and traces the estimated graph components.

The component extraction unit 14 may estimate each of components of a graph from the graph image using different methods for each graph type. Details of those graph component extraction processing will be described below with reference to FIGS. 8 to 14.

According to the present embodiment, a probability map provided for each of graph types is used to estimate each of graph components from a graph image. By using the probability map provided for each graph type, it makes it possible to obtain the probability of the appearance of each component for each pixel in the graph image so as to facilitate estimation of a region of each component.

For this reason, for example, even when a graph image contains artifacts, noise or gradation, when graph components cross or overlap each other or are separated from other components, when the image is highly compressed and has low resolution, or when the boundaries between graph components are not clear, it makes it possible to estimate each component of a graph from a graph image with higher accuracy.

In step S5, the value extraction unit 15 of the graph image analysis apparatus 1 extracts graph values corresponding to respective components of the graph estimated in step S4.

For a graph image of a pie chart, the value extraction unit 15 extracts values of the pie chart based on the area of the segments (i.e., components) of the pie slices acquired in step S4 and the character recognition results of the text strings labeled to axes and components of the graph.

For graph images of bar and line graphs, the value extraction unit 15 extracts values of the bar and line graphs, respectively, by determining the relationship between the pixel coordinates of components of the bar graph or the line graph and the character recognition results of the text strings labeled to axes and components of the graph, based on the geometrical arrangement thereof.

More particularly, the value extraction unit 15 first reads an entire graph image using the OCR (Optical Character Recognition), detects text from the graph image, and groups the text boxes of the detected text into either the vertical axis or the horizontal axis. Text boxes may also be grouped into either the legend or the title.

Subsequently, the value extraction unit 15 determines, for the bar and line graphs, the scale of the vertical and horizontal coordinate axes based on the position of the text boxes that contain numeric characters as text.

The value extraction unit 15 may further identify values corresponding to respective tick-marks of the graph axes using the probability map of the tick-marks of graph axes of the bar or line graph, and generate values for respective components based on the identified values. When a value corresponding to each tick-mark of the graph axis is not available, for example, the centroid coordinate of a bounding box containing numerical values may be used as the value corresponding to the tick-mark of the graph axis.

Applying the determined coordinate axis scales, the value extraction unit 15 converts the coordinates of each component of the graph into graph values.

More particularly, the value extraction unit 15 converts the pixel coordinates of all points on each line component of a line graph to graph values. The value extraction unit 15 also converts the vertex Y-coordinates (i.e., vertical coordinates) and rightmost X-coordinates (i.e., horizontal coordinates) of each bar segment component of the bar graph to graph values. On the other hand, for pie charts, the value extraction unit 15 generates graph values based on the area ratio or the central angle of each pie slice component in the pie chart.

In step S6, the output unit 16 of the graph image analysis apparatus 1 appends the graph values and information on the scale of the coordinate axes and the like, which are extracted by the value extraction unit IS, to the graph components, which are extracted and traced by the component extraction unit 14, and outputs the value-appended graph components as the digital data of the graph to the output data set 4.

Figure 7:
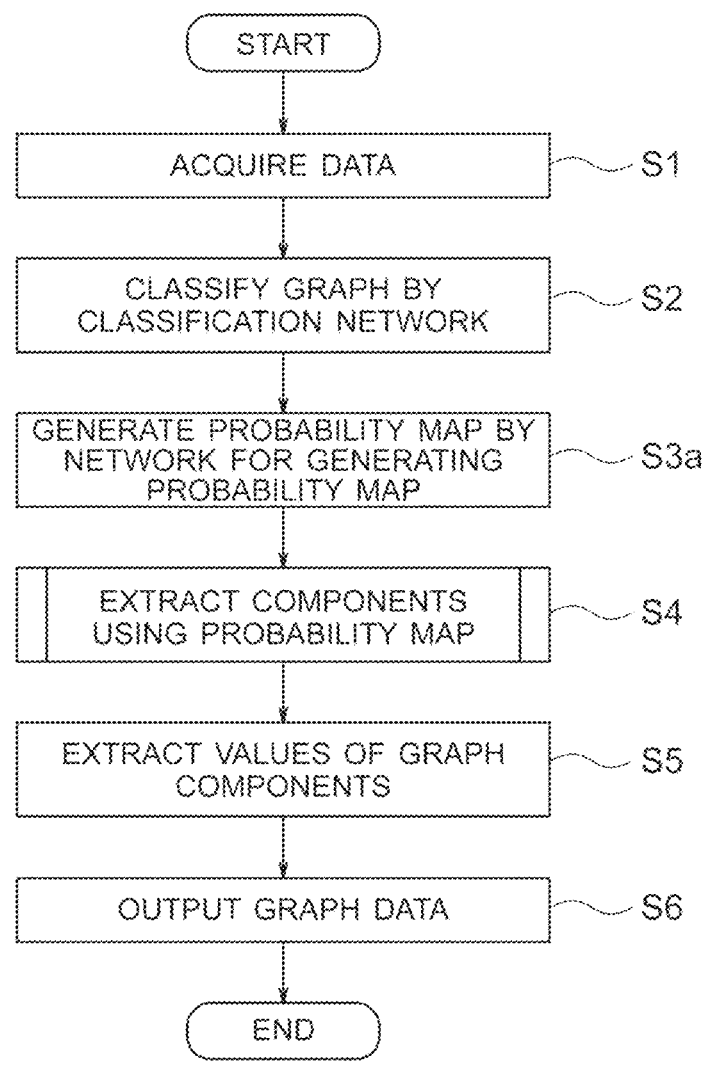
FIG. 7 is a flowchart illustrating an exemplary modification to the processing procedure of the graph image analysis processing performed by the graph image analysis apparatus according to the embodiments.

FIG. 7 is a flowchart illustrating an exemplary modification of the processing procedure of the graph image analysis processing performed by the graph image analysis apparatus 1. In the example shown in FIG. 7, the graph image analysis apparatus 1 inputs the graph image classified by the graph classification unit 12 to the probability map generation unit 13.

The processing in steps S1 and S2 in FIG. 7 is similar to the processing in steps S1 and S2 shown in FIG. 3.

In step S3a, the probability map generation unit 13 of the graph image analysis apparatus 1 generates, using the network 24 for generating probability maps, a probability map for each of graph types for extracting respective components from classified graph image.

Although the network 24 for generating probability maps may be formed as a learning model that have been already trained with different training data for each graph type to be analyzed, alternatively, the network 24 for generating probability maps may differ for each graph type only in the output channels of the network, and the networks other than the output channels may have a common structure.

In other words, in step S3a, in order to generate the probability maps from the classified graph images, the probability map generation unit 13 may use different networks (i.e., segmentation models) for different graph types, respectively, or alternatively, use a single network (i.e., segmentation model).

The processing in steps S4 to S6 in FIG. 7 is similar to the processing in steps S4 to S6 shown in FIG. 3.

(First Graph Component Extraction Processing)

Figure 8:
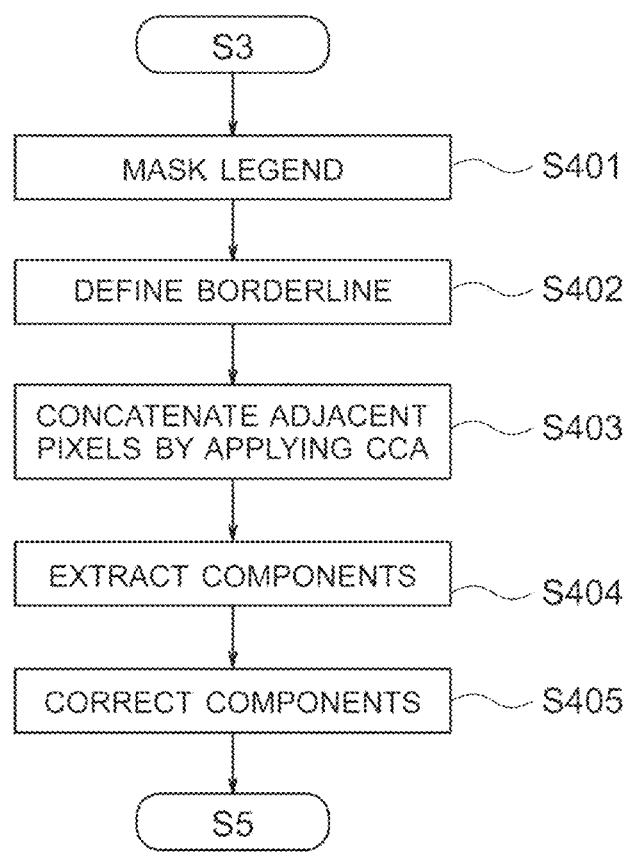
FIG. 8 is a flowchart illustrating an exemplary detailed processing procedure of component extraction processing in step S4 in FIG. 3, which is performed for a bar graph and a pie chart by a component extraction unit of the graph image analysis apparatus.

FIG. 8 is a flowchart illustrating an exemplary detailed processing procedure of the component extraction (i.e., graph tracing) processing of step S4 in FIGS. 3 and 7, which is performed by the component extraction unit 14 of the graph image analysis apparatus 1 for bar graphs and pie charts.

In step S401, the component extraction unit 14 masks regions of the legend in the graph image. The component extraction unit 14 may detect the regions of the legend in the graph image using the probability map of legends generated in step S3 of FIG. 3, and mask the detected regions of the legend on the probability map of segmentation generated in step S3 of FIG. 3. This allows the segmentation in the graph image of the regions where graph components appear from the regions of the legend.

In step S402, the component extraction unit 14 defines borderlines of respective components of the graph image. More particularly, the component extraction unit 14 uses the probability map of borderlines generated in step S3 of FIG. 3 to define the borderlines, and removes the borderlines from the probability map of segmentation of the graph image.

In step S403, in order to extract components of bar graphs and pie charts, the component extraction unit 14 applies the CCA (Connected Component Analysis) to concatenate adjacent pixels in the graph image.

The CCA is capable of grouping adjacent pixels with similar colors in the RGB color space. Therefore, applying the CCA, it makes it possible to concatenate adjacent pixels that have similar colors to extract each of components.

In step S404, the component extraction unit 14 uses the probability map of segmentation from which the borderlines are removed in step S403 and the probability map of color to extract, as a component of the graph of the graph image, the connected components concatenated by applying the CCA, and traces the component of the graph.

The component extraction unit 14 may further discard components that are out of the shape of the component estimated from the probability map of segmentation by graph type, among the connected components constituted by concatenating pixels.

For example, for a bar graph, connected components that are not rectangular in shape may be discarded, and for a pie chart, connected components that are not pie slice shaped may be discarded.

In step S405, the component extraction unit 14 corrects the components extracted in step S404 as appropriate.

In steps S403 and S404, adjacent pixels are concatenated when the adjacent pixels have similar colors to each other. Therefore, for example, when a graph component has a color gradation or texture instead of a single color, or when a 3D effect is applied to a graph component, there is a risk that pixels that are to be concatenated are likely not be concatenated actually.

According to the present embodiment, since the probability map of color (i.e., dominant colors) and the probability map of segmentation, which are generated in step S3 of FIG. 3, are used, it makes it possible to correct the graph components extracted in step S404 based on the color and shape of the graph components estimated from the probability maps.

Figure 9:
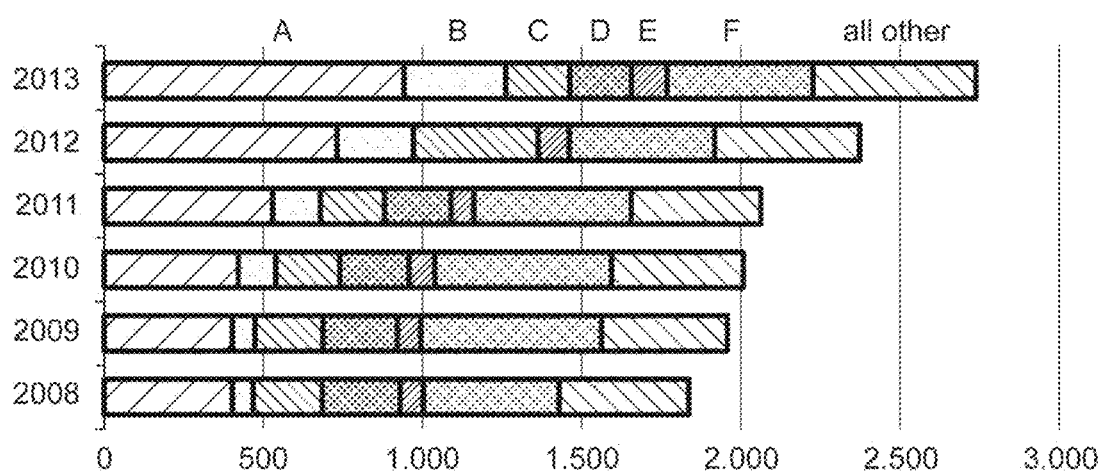
FIG. 9 is a schematic diagram illustrating an example for extracting components of a bar graph from a bar graph image using a probability map for the bar graph by the component extraction unit of the graph image analysis apparatus.

FIG. 9 is a diagram illustrating an example in which the component extraction unit 14 of the graph image analysis apparatus 1 extracts bar graph components from a bar graph image using a probability map of the bar graph.

Referring to FIG. 9, in the horizontal bar graph in FIG. 9, the Y-coordinate axis denotes the year and the X-coordinate axis denotes oil production amount, with oil production amount in each year constituting one bar segment. One bar segment is further broken down into sub-segments for regions A to F and all other regions.

By performing the component extraction processing by the component extraction unit 14 for the bar chart, each of sub-segments of the six bar segments is extracted as a component, as can be understood from the bold frame enclosing each sub-segment.

For example, it is assumed that, when the processes in steps S401 to S404 of FIG. 8 are completed, some of the bar segments of a certain year in FIG. 9 fail to be segmented into sub-segments of the respective regions. According to the present embodiment, by performing the correction processing in step S405 of FIG. 8, it makes it possible to individually extract each of components whose colors are mutually similar and therefore difficult to separate, using the probability map of color and the probability map of segmentation.

(Second Graph Component Extraction Processing)

Figure 10:
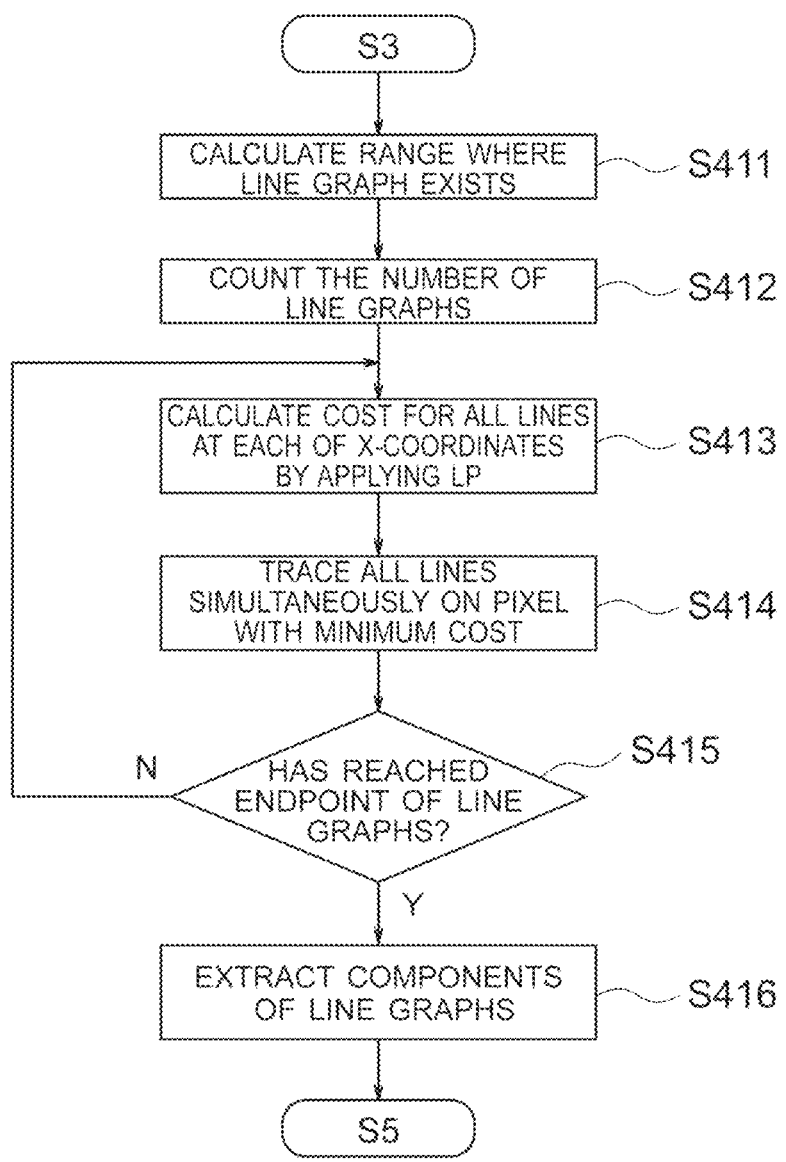
FIG. 10 is a flowchart illustrating an exemplary detailed processing procedure of the component extraction processing in step S4 in FIG. 3, which is performed for a line graph by the component extraction unit of the graph image analysis apparatus according to a first embodiment.

FIG. 10 is a flowchart illustrating an exemplary detailed processing procedure of the component extraction (i.e., graph tracing) processing in step S4 of FIG. 3, which is performed by the component extraction unit 14 of the graph image analysis apparatus 1 for line graphs.

In step S411, the component extraction unit 14 of the graph image analysis apparatus 1 calculates the existence range of a line graph.

More particularly, the component extraction unit 14 detects the start point and the end point of the line graph by obtaining the X-coordinate range where the line graph exists. In step S411, it is assumed that the component extraction unit 14 has calculated the Line Probability (LP) map in advance by averaging multiple probability maps of multiple line types generated in step S3 of FIG. 3 (e.g., four line types in FIGS. 6B to 6E) for each pixel position.

The component extraction unit 14 calculates the existence probability of the stacked (added together) lines at each X-coordinate axis position by calculating the sum of the existence probabilities of the multiple lines along the Y-coordinate axis direction. Subsequently, in order to obtain the distribution of the existence probabilities of the lines along the X-coordinate axis, the component extraction unit 14 binarizes the stacked line existence probabilities using the threshold value $\theta_{th}$. In this way, the existence range of the line graph is obtained as the minimum and maximum values of the clusters of the existence distribution of lines on the X-coordinate axis.

As described above, according to the present embodiment, it makes it possible to trace a line graph even when a graph image of the line graph does not contain a legend outside the existence range of the line graph, without the need to refer to a region of the legend to define the existence range of the line graph.

In step S412, the component extraction unit 14 counts the number of line graphs.

More particularly, the component extraction unit 14 binarizes the line probability map using the threshold $p_{th}$, and then scans the binarized line probability map along the Y-coordinate axis at each X-coordinate position to count the number of pixel clusters on the X-coordinate axis. As a result, the number of line graphs is obtainable using the number of pixel clusters on the X-coordinate axis.

In step S413, the component extraction unit 14 calculates the costs of all lines at each X-coordinate position by applying the Linear Programming (LP).

In step S414, the component extraction unit 14 simultaneously traces all lines on the pixel where the sum of the costs of all lines is minimized.

The CCA concatenates pixels based on colors in the RGB color space, thus the CCA is difficult to apply to line graphs, which draw lines with dots. Therefore, according to the present embodiment, line graphs are traced using the Linear Programming (LP).

The Linear programming (LP) is an algorithm that finds the value that maximizes or minimizes an objective function expressed as a linear equation, subject to constraints expressed as a first-order inequality or linear equation.

More particularly, according to the present embodiment, the Linear Programming is applied with each of the multiple lines of a line graph being assumed as a path in a digraph, and the line graph is traced so as to minimize the cost of the flows in the digraph.

The component extraction unit 14 samples pixels having higher line probability as nodes, and connects adjacent nodes in the X-axis direction to trace the line graph.

According to the present embodiment, the Linear Programming is applied to determine the assignment from a pixel to any one of multiple lines. By applying the Linear Programming, it makes it possible to accommodate more complex recursive algorithms and simultaneously optimize the cost functions for all lines of the line graph.

When a line graph contains multiple lines and each of multiple lines is to be traced individually, in case that the line graph has an interval where the multiple lines overlap, a certain line is likely to be occluded by another line so that the occluded line may not be traced accurately.

According to the present embodiment, the Linear Programming is applied to simultaneously trace multiple lines, which may be multiple lines of multiple line types, for each X-coordinate position. Also, for each sample point to be traced, the present embodiment holds an occlusion flag, which indicates whether or not each of the multiple lines is occluded by another line, and traces the multiple lines simultaneously by referring to the occlusion flag.

The component extraction unit 14 uses the existence range (i.e., X-coordinate range) of the line graph calculated in step S411 and the number of line graphs counted in step S412 to trace the line graph using the Linear Programming (LP) along the X-axis from the start point to the end point of the detected line graph.

More particularly, the component extraction unit 14 uses the binary variable b ($b \in \{0, 1\}$) to estimate the line that connects two points in the binarized line probability map (i.e., segmentation map).

The component extraction unit 14 scans pixels vertically along the Y-coordinate axis, starting from the leftmost X-coordinate $x_i$, and for each X coordinate $x_i$, samples at most twice as many points as the number of lines of the graph $n_{line}$.

Subsequently, the component extraction unit 14 minimizes the Linear Programming (LP) function including the cost function c and the binary variable b, which is shown in the following Equation 1.

$$\sum_{i=1}^{n_{ampl}-1} \sum_{\substack{y \in Y_i \\ y' \in Y'_i}} \sum_{l=1}^{n_{line}} \sum_{\substack{z,z' \\ \in \{0,1\}}} c(x_i, y, y', l, z, z') b(x_i, y, y', l, z, z') \quad \text{(Equation 1)}$$

where i denotes the index of the sample point in the X-coordinate, $Y_i$ and $Y'_i$ denote a set of Y-coordinates at the sample points $x_i$ and $x_{i+1}$, respectively (i.e., $Y'_i = Y_{i+1}$), l denotes the index of the line. The variables z and z' denote whether or not the first sample point ($x_i$, y) or the second sample point ($x_{i+1}$, y') is occluded or not, respectively. The binary variables $b(x_i, y, y', l, z, z')$ denote the flow whether or not the first and second sample points are on the same l-th line, respectively.

Figure 11:
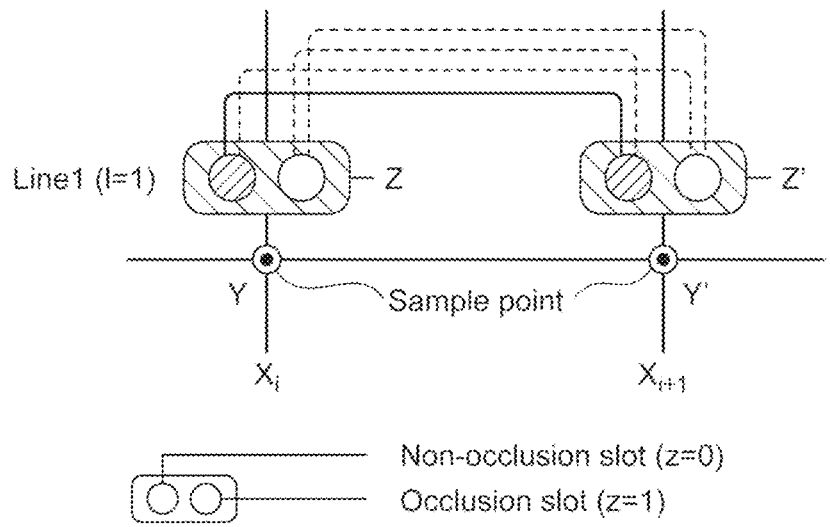
FIG. 11 is a schematic diagram illustrating an exemplary line trace algorithm in case of an example of a single line, which is performed for a line graph by the component extraction unit of the graph image analysis apparatus.

FIG. 11 is a schematic diagram illustrating an exemplary line tracing algorithm performed by the component extraction unit 14 of the graph image analysis apparatus 1 for a line graph in an example of a single line.

Referring to FIG. 11, when tracing a single line, four combinations of foreground/occlusion are possible for two adjacent sample points. In other words, four combination patterns are whether or not the first or second sample point is either in the foreground or occluded, respectively.

The component extraction unit 14 is equipped with, for each sample point of line 1, the occlusion flag that holds the status of whether the line 1 is in the foreground or occluded. In each occlusion flag, the left slot is set on if the left slot is not occluded (i.e., in the foreground) (z=0) and the right slot is set on if the right slot is occluded (z=1).

In the example shown in FIG. 11, the line to be traced is a single line, and thus no occlusion by other lines occurs.

For this reason, the solution of the LP function is obtainable as the binary variable $b(x_i, y, y', l=1, z=0, z'=0)=1$, so that a solid line is traced between the two adjacent sample points, as shown in FIG. 11.

Figure 12:
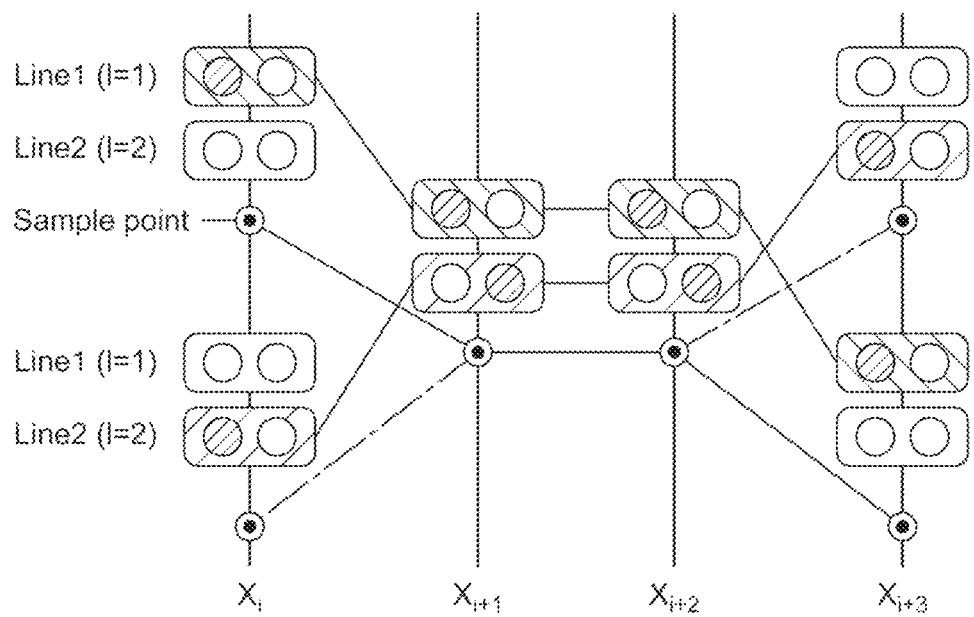
FIG. 12 is a schematic diagram illustrating an exemplary line trace algorithm in case of an example of multiple lines, which is performed for the line graph by the component extraction unit of the graph image analysis apparatus.

FIG. 12 is a schematic diagram illustrating an exemplary line tracing algorithm performed by the component extraction unit 14 of the graph image analysis apparatus 1 for a line graph in an example of multiple lines.

Referring to FIG. 12, when tracing two lines that are partially occluded, four patterns are possible at each sample point for each of two lines. That is, at each sample point, four patterns are whether or not the lines 1 and 2 are either in the foreground or occluded, respectively.

The component extraction unit 14 is equipped with, for each sample point, the occlusion flags that hold the status of whether the line 1 and the line 2 are in the foreground or occluded, respectively.

In the example shown in FIG. 12, the line 2 (i.e., dashed-dotted line) is partially occluded by the line 1 (i.e., solid line) between sample points $X_{i+1}$ and $X_{i+2}$. In this case, in the occlusion flags within the interval where the line 2 is occluded, the foreground slots are set on for the line 1, and the occlusion slots are set on for the line 2.

As shown in FIG. 12, the component extraction unit 14, using the Linear Programming (LP), holds and refers the status of whether each line is in the foreground or occluded at each sample point with the occlusion flag for each line so as to simultaneously trace two lines.

It should be noted that the component extraction unit 14 recursively traces multiple lines using the Linear Programming (LP), as shown in Equation 1, and FIG. 12 illustrates solely the eventual flow after solving the Linear Programming (LP).

The cost function c of the LP shown in Equation 1 is defined in the following Equation 2.

$$c(x_i, y, y', l, z, z') = \quad \text{(Equation 2)}$$
$$\lambda_{col} c_{col}(\cdot) + \lambda_{sty} c_{sty}(\cdot) + \lambda_{fg} c_{fg}(\cdot) + \lambda_{sm} c_{sm}(\cdot) + \lambda_{occ}$$

where $C_{col}$ denotes the cost term indicating consistency in the color of the line being traced.

$C_{sty}$ denotes the cost term indicating consistency in line style (i.e., line type), $C_{fg}$ denotes the cost term indicating the probability that the line concerned is in the foreground, and $C_{sm}$ denotes the cost term indicating the smoothness of the line to smoothly connect adjacent pixels of the line being traced without overly steep slopes. The cost function c in Equation 2 further includes a bias weight $\lambda_{occ}$ term based on the occlusion flag (z, z'). The cost function c shown in Equation 2, with terms on the foreground and occlusion of lines, allows multiple lines to be fitted simultaneously.

To calculate respective cost terms, the k-means method is used to estimate, based on the source image I and the 4-dimensional line type space S, the center of gravity of feature vectors in the feature space (4+3 dimensions) of each line.

Respective cost terms in Equation 2 are calculated as in Equations 3 to 6 below, respectively.

$$c_{col}(x_i, y, y', l) = \sum w_{col}(x^*, y^*, l)/\Delta \quad \text{(Equation 3)}$$

$$c_{sty}(x_i, y, y', l) = \sum w_{sty}(x^*, y^*, l)/\Delta \quad \text{(Equation 4)}$$

$$c_{fg}(x_i, y, y') = \sum w_{fg}(x^*, y^*)/\Delta \quad \text{(Equation 5)}$$

$$c_{sm}(x_i, y, y') = |h|/H \quad \text{(Equation 6)}$$

where $h = y' - y$, $\Delta = (h^2 + d^2)^\alpha$ ($\alpha$ is a constant), H denotes the height of the image.

(x*, y*) passes through the interpolation points between two adjacent sample points ($x_i$, y), ($x_i + r$, y±1), ..., ($x_{i+1}$, y').

Here, $r = d/(y - y')$ and ± depends on whether y to y' is an increase or a decrease. Respective weight functions are calculated as in Equations 7 to 9 below, respectively.

$$w_{col}(x^*, y^*, l) = \|I(x^*, y^*) - I^l\|_1 \quad \text{(Equation 7)}$$

$$w_{sty}(x^*, y^*, l) = \|S(x^*, y^*) - S^l\|_1 \quad \text{(Equation 8)}$$

$$w_{fg}(x^*, y^*) = \max(0, 1 - \|S(x^*, y^*)\|_1) \quad \text{(Equation 9)}$$

To complete the recursive line tracing by the LP, the LP function shown in Equation 1 may be minimized using the following constraints:

The number of input lines and output lines to each sample point is equal.

The number of lines entering each non-occluded sample point for each line is at most 1.

The value of b during the optimization is within the range [0, 1].

The number of lines output at the leftmost x index is $n_{line}$.

As described above, according to the present embodiment, as the component extraction unit 14 uses, applying the Linear Programming, the probability maps of the line graph and the evaluation functions that take into account attributes of the line graph such as consistency in line type or color, line smoothness, and the like. Thus, it makes it possible to trace line graphs with higher accuracy and lower computational load without relying on information on the legend in the graph image.

In addition, according to the present embodiment, using the occlusion flag that is provided for each sample point for the number of lines and indicates either the foreground or occlusion status, it makes it possible to simultaneously trace multiple lines by applying the Line Programming, thereby allowing the line graph tracing at higher performance.

Alternatively, the component extraction unit 14 may trace a line graph contained in a graph image based on attributes of the line graph such as the consistency in line type or color, line smoothness, and the like, between the start point and the end point of the detected line graph, without relying on the Linear Programming using the above evaluation functions or the probability maps.

Referring back to FIG. 10, in step S415, the component extraction unit 14 determines whether or not the traced line graph reaches the end point detected in step S411. While the traced line graph does not yet reach the end point (S415: N), the processing returns to step S413 and the component extraction unit 14 repeats the processes of steps S413 and S414. On the other hand, when the traced line graph reaches the end point (S415: Y), the processing proceeds to step S416.

In step S416, the component extraction unit 14 extracts each of the traced lines as a component of the line graph and the processing proceeds to step S5.

Figure 13:
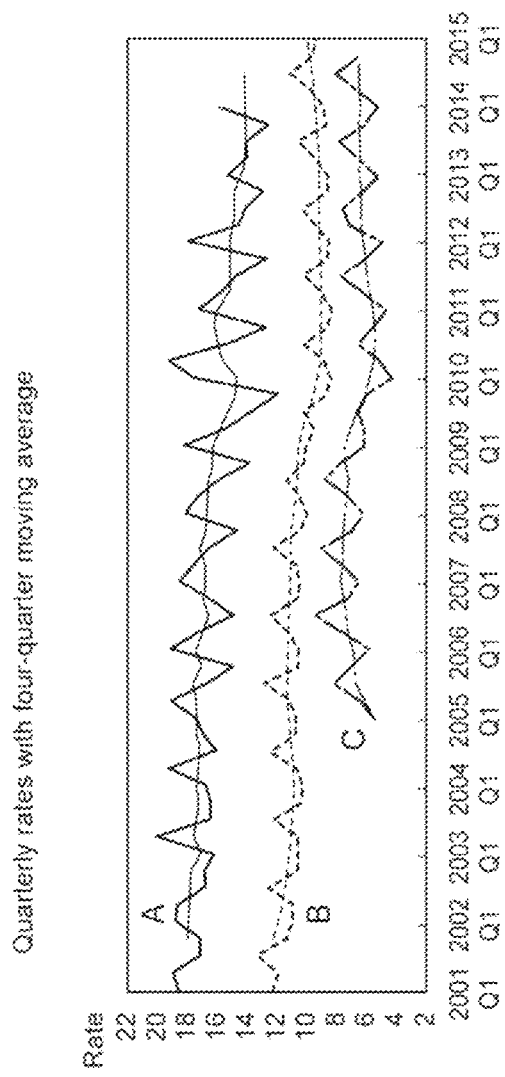
FIG. 13 is a schematic diagram illustrating an example of a line graph, which is traced from a line graph image using the probability map for the line graph by the component extraction unit of the graph image analysis apparatus.

FIG. 13 is a diagram illustrating an example of a line graph traced from a line graph image using the probability map of line graphs by the component extraction unit 14 of the graph image analysis apparatus 1.

Referring to FIG. 13, the line graph in the legend A is traced by a solid line, the line graph in the legend B by a dashed line, and the line graph in the legend C by a single dotted (dashed-dotted) line, respectively. Each of legends A to C contains two line graphs that intersect each other, with the thick line graph plotting values for respective years and having a steep waveform, and the thin line graph showing a multi-year moving average and having a smooth waveform.

As shown in FIG. 13, for example, when two line graphs intersect, according to the present embodiment, the component extraction unit 14 evaluates which direction to trace the line from the intersection using the cost function of line smoothness $C_{sm}$. Thus, it makes it possible to sharply distinguish, from the thick line graph, the thin line graph that intersects the thick line graph to accurately trace the thin line graph, even when the colors and line types are mutually identical.

Figure 14:
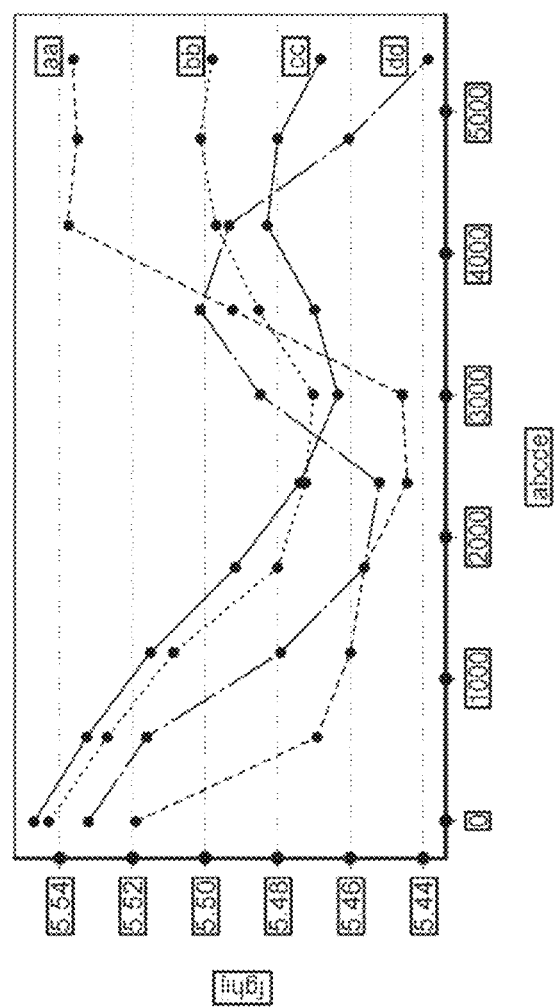
FIG. 14 is a schematic diagram illustrating an example in which graph values are extracted from the line graph image by a value extraction unit of the graph image analysis apparatus.

FIG. 14 is a diagram illustrating an example in which the value extraction unit 15 of the graph image analysis apparatus 1 extracts (generates) graph values from a line graph image.

Referring to FIG. 14, the text boxes detected by scanning the graph image are indicated by rectangular regions, respectively. Since the value extraction unit 15 scans the entire graph image, in FIG. 14, in addition to the labels for the X-coordinate axis and the Y-coordinate axis, the labels assigned to the line graphs in the drawing area of the line graph are detected as text boxes. According to the present embodiment, the value extraction unit 15 recognizes the text strings in the detected text boxes, and when a numerical value is recognized, the value extraction unit 15 calculates the graph scale from the recognized numerical value and generates the graph values corresponding to respective labels.

As described above, according to this embodiment, the graph image analysis apparatus classifies graph images by graph type, calculates probability maps of different graph images by graph type, extracts multiple components in a graph image based on the calculated probability map, and trace graphs of the extracted multiple components. The graph image analysis apparatus further extracts values of the extracted components of the graph image, and outputs the traced graph with the values of the extracted components being appended thereto.

By calculating probability maps different from each other by graph type and using the calculated probability maps, it makes it possible to separate each of components of a graph from the graph image more universally and efficiently.

As a result, it makes it possible to analyze images of more diverse graphs at higher speed with higher accuracy so as to improve the availability of a large number of scattered graph images on the Web and elsewhere.

Second Embodiment

Hereinafter, a second embodiment according to the present invention will be described in detail below, only with respect to the points where the second embodiment differs from the first embodiment above with reference to FIG. 15. According to the second embodiment, the Dynamic Programming (DP) is applied to the component extraction processing shown in FIG. 3, which is performed for line graphs, to trace lines for each of line types of the line graph.

Figure 15:
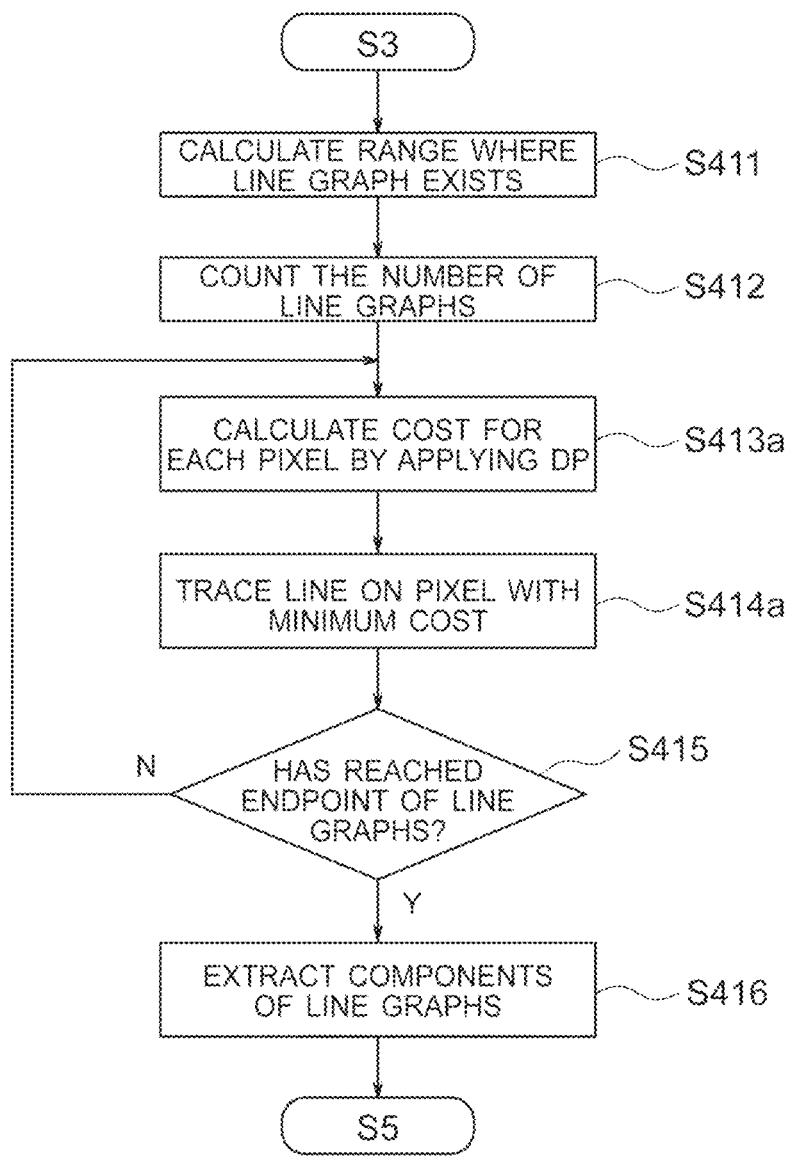
FIG. 15 is a flowchart illustrating an exemplary detailed processing procedure of the component extraction processing in step S4 in FIG. 3, which is performed for a line graph by the component extraction unit of the graph image analysis apparatus according to a second embodiment.

FIG. 15 is a flowchart illustrating an exemplary detailed processing procedure of the component extraction (i.e., graph tracing) processing in step S4 of FIG. 3, which is performed by the component extraction unit 14 of the graph image analysis apparatus 1 for line graphs.

The processes in steps S411 and S412 in FIG. 15 are similar to the processes in steps S411 and S412 of the first embodiment shown in FIG. 10.

In step S413$a$, the component extraction unit 14 calculates the cost of adjacent pixels by applying the Dynamic Programming (DP).

In step S414$a$, the component extraction unit 14 traces a line on the pixel with the lowest cost. The component extraction unit 14 traces each of the lines of multiple line types sequentially and individually.

According to the present embodiment, the Dynamic Programming (DP) is used to trace line graphs.

The Dynamic Programming (DP) is an algorithm that divides a target problem into multiple subproblems and solves the subproblems while recording the calculation results of the subproblems.

According to the present embodiment, the Dynamic Programming is applied to calculate the cost of each pixel within the existence range of the line graph. By reusing the intermediate calculation results, it makes it possible to avoid the repetition of calculations so as to improve calculation efficiency.

The component extraction unit 14 uses the existence range of the line graph calculated in step S411 and the number of counted line graphs in step S412 to trace the line graphs along the X-axis from the start point to the end point of the detected line graphs using the Dynamic Programming.

More particularly, the component extraction unit 14 uses a table W to hold the total cost of the points (pixels) on the line to be traced. The table W holds each value of the coordinate x=(x, y).

The values of W are calculated by the following Equation 10.

$$W_x = \min_{x_{prev} \in X_{prev}} \{\lambda_1 E_{color}(x, x_{prev}) + \lambda_2 E_{pattern}(x, x_{prev}) + \quad \text{(Equation 10)}$$
$$\lambda_3 E_{smooth}(x, x_{prev}) + W_{x_{prev}}\} - \lambda_4 E_{prob}(x) + \lambda_5 E_{dnpl}(x)$$

where x denotes the pixel coordinates as x=(i, j). $x_{prev}$ denotes the pixel immediately before on the x coordinate of x (i.e., the last point traced immediately before).

$X_{prev}$ denotes a group of pixels of the x coordinate up to the previous pixel i−1, which is represented by the following Equation 11.

$$X_{prev} = \{(i-1, j+k)\}_{k=-N}^{N-1} \quad \text{(Equation 11)}$$

In order to determine to which line to be traced x belongs, the component extraction unit 14 uses the Dynamic Programming to find, from $X_{prev}$ in Equation 11, the optimal one that minimizes the value of the cost function in Equation 10.

According to the present embodiment, multiple evaluation functions, for example, as shown in Equation 10, five evaluation functions, such as $E_{color}$, $E_{pattern}$, $E_{smooth}$, $E_{prob}$, and $E_{dupl}$ are used to calculate the cost of each point (i.e., each pixel) such that the cost evaluated by those evaluation functions is minimized.

The evaluation function $E_{color}$ is a color function that maintains consistency in the color of the line to be traced. Since the Dynamic Programming retains information on the traced lines to which $x_{prev}$ belongs, it makes it possible to calculate the average line color of $x_{prev}$ from this line information. $E_{color}$ is calculated by the color difference between the average line color and the pixel color of x.

The evaluation function $E_{pattern}$ is a function of the line type that maintains consistency in the line type (i.e., line pattern) of lines to be traced. The evaluation function $E_{pattern}$, similarly to the evaluation function $E_{color}$, is calculated by the difference between the average line type of $x_{prev}$ and the line type of x.

The evaluation function $E_{smooth}$ is a function of the smoothness of the line that smoothly concatenates adjacent pixels of the line to be traced without excessively steep slopes. The evaluation function $E_{smooth}$ is calculated by the absolute difference between the slope of $x_{prev}$ and the slope of x.

The evaluation function $E_{prob}$ is a function of the existence probability for connecting the lines to be traced along pixels with high existence probability values. The evaluation function $E_{prob}$ is calculated by the mean value of the existence probability of multiple line types.

The evaluation function $E_{dupl}$ is a duplication function that penalizes when multiple lines are traced on the same pixel. When x is already traced by another line, the evaluation function $E_{dupl}$ returns 1; otherwise, it returns 0.

$\lambda 1$ to $\lambda 5$ are the weighting coefficients for respective evaluation functions.

The component extraction unit 14 uses multiple evaluation functions as described above to sequentially determine the point (i.e., pixel) with the lowest cost as the next point (i.e., pixel) to be traced at each point of the X-coordinate from the start point to the end point of the detected line graph.

According to the present embodiment, for example, the evaluation function of the line type $E_{pattern}$, the evaluation function of the existence probability $E_{prob}$, and the like, may refer to the probability map of the line graph generated in step S3 of FIG. 3 (the probability maps of four line types in FIG. 6B to FIG. 6E). For example, a point (pixel) that does not fit into any of the four line types can be determined not to be traced.

The processes in steps S415 and S416 in FIG. 15 are similar to the processes of steps S415 and S416 in FIG. 10 according to the first embodiment.

As described above, according to the present embodiment, the Dynamic Programming allows line graphs to be traced with higher accuracy and less computational load, without relying on the information on the legend in graph images, by using the probability map of the line graph and the evaluation functions that take into account line graph attributes such as the consistency in line type or color of the line graph, smoothness of the line, and the like.

<Hardware Configuration of Graph Image Analysis Apparatus>

Figure 16:
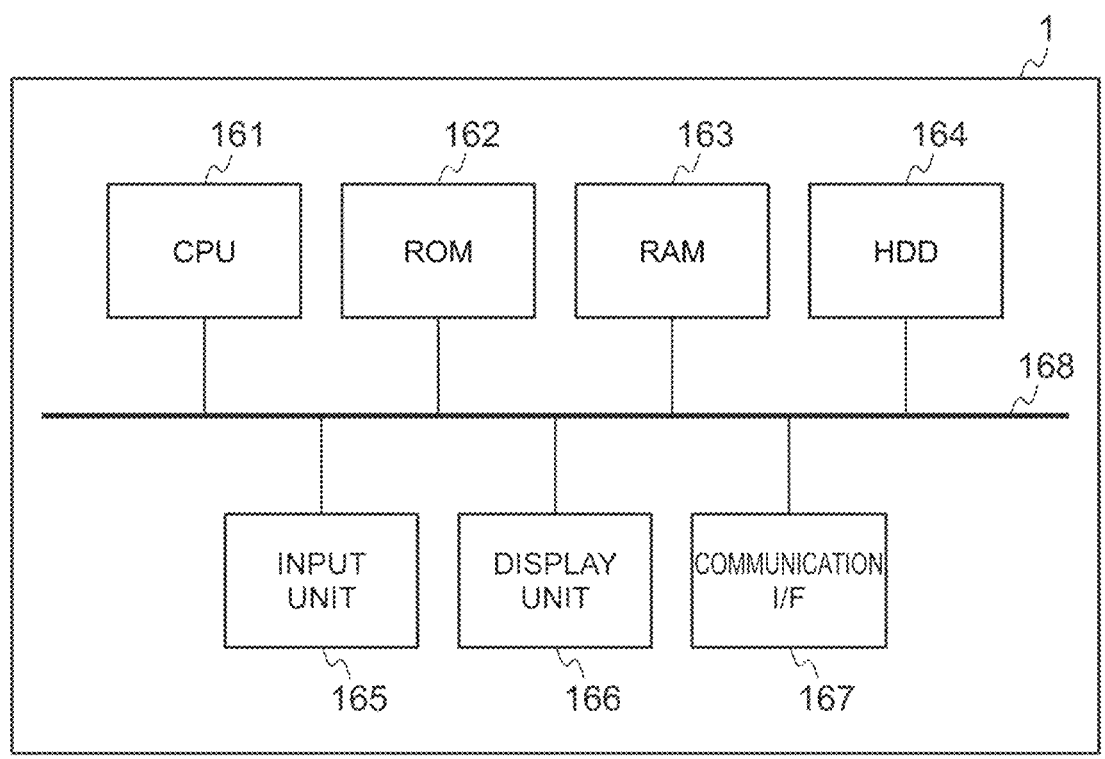
FIG. 16 is a block diagram illustrating an exemplary hardware configuration of the graph image analysis apparatus according to the respective embodiments of the present invention.

FIG. 16 is a diagram showing a non-limiting exemplary hardware configuration of the graph image analysis apparatus 1 according to the present embodiment.

The graph image analysis apparatus 1 according to the present embodiment can be implemented on any one or more computers, mobile devices, or any other processing platform.

As shown in FIG. 16, the graph image analysis apparatus 1 includes a CPU 161, a ROM 162, a RAM 163, an HDD 164, an input unit 165, a display unit 166, a communication I/F 167, and a system bus 168. The learning model extraction apparatus 1 may also incorporate an external memory.

The CPU 161 controls operations of the graph image analysis apparatus 1 in an integrated manner and controls the respective components (162 to 167) via the system bus 168 serving as a data transmission channel.

The graph image analysis apparatus 1 may also include a GPU (Graphics Processing Unit). The GPU has higher computing capabilities than the CPU 161, and by operating multiple or a large number of GPUs in parallel, it makes it possible to provide higher processing performance, particularly for the image processing applications that use the machine learning such as the present embodiment. The GPU typically includes a processor and a shared memory. Respective processors acquire data from a high speed shared memory and execute a common program so as to execute the same kind of computation in a large amount at high speed.

The ROM (Read Only Memory) 162 is a non-volatile memory that stores a control program or the like required for CPU 161 to execute the processes. Instead, the program may be stored in a non-volatile memory such as the HDD (Hard Disk Drive) 164 or an SDD (Solid State Drive) or the like, or an external memory such as a removable storage medium (not shown).

The RAM (Random Access Memory) 163 is a volatile memory and functions as a main memory or a work area, or the like, for the CPU 161. In other words, the CPU 161 loads a required program or the like from the ROM 162 into the RAM 163 at the time of executing the processes and executes the program or the like to realize various functional operations.

The HDD 164 stores, for example, various data and various information required when the CPU 161 performs a process using a program. Furthermore, the HDD 164 stores, for example, various data and various information obtained by the CPU 161 performing a process using a program or the like.

The input unit 165 is constituted with a keyboard or a pointing device such as a mouse.

The display unit 166 is constituted with a monitor such as a liquid crystal display (LCD). The display unit 166 may provide a GUI (Graphical User Interface) for input various parameters used in the graph image analysis processing and communication parameters used in communication with external devices, and the like, to the graph image analysis apparatus 1.

The communication I/F 167 is an interface for controlling communication between the graph image analysis apparatus 1 and the external devices.

The communication I/F 167 provides an interface to the network and executes communication with external devices via the network. Image data, various parameters, and other data are sent and received to and from the external device via the communication I/F 167. According to the present embodiment, the communication I/F 167 may execute communication via a wired LAN (Local Area Network) that conforms to communication standards such as Ethernet (registered trademark) or leased line. However, the network available in the present embodiment is not limited thereto and may be constituted with a wireless network. The wireless network may include a wireless PAN (Personal Area Network) such as Bluetooth (registered trademark), ZigBee (registered trademark), UWB (Ultra Wide Band), and the like. The wireless network may also include a wireless MAN (Metropolitan Area Network) such as Wi-Fi (Wireless Fidelity) (registered trademark), and the like. The wireless network may further include a wireless WAN (Wide Area Network) such as LTE/3G, 4G, 5G, and the like. It should be noted that the network need only be capable of connecting respective devices and allowing them to communicate with each other, and the communication standards, scale, and configuration are not limited to the above.

Functions of at least some of the elements of the graph image analysis apparatus 1 shown in FIG. 1 may be realized by the CPU 161 executing programs. Nevertheless, at least a part of the functions of the elements of the graph image analysis apparatus 1 shown in FIG. 1 may operate as a dedicated hardware. In this case, the dedicated hardware operates based on the control of the CPU 161.

Although specific embodiments have been described above, the embodiments described are illustrative only and are not intended to limit the scope of the present invention. The apparatus and method described herein may be embodied in other forms than as described above. In addition, it is also possible to appropriately omit, substitute, or modify the above described embodiments without departing from the scope of the present invention. Embodiments with such omissions, substitutions and modifications fall within the scope of the appended claims and equivalents thereof and also fall within the technical scope of the present invention.

REFERENCE SIGNS LIST

1: Graph Image Analysis Apparatus; 3: Input Data Set; 4: Output Data Set; 11: Data Acquisition Unit; 12: Graph Classification Unit; 13: Probability Map Generation Unit; 14: Component Extraction Unit; 15: Value Extraction Unit; 16: Output Unit; 21: Input Data; 22: Classification Network; 23: Classification Result; 24: Network for Generating Probability Map; 25: Probability Map; 26: Graph Tracing Result; 27: Value Detection Result; 28: Output Data; 161: CPU; 162: ROM; 163: RAM; 164: HDD; 165: Input Unit; 166: Display Unit; 167: Communication I/F; 168: Bus

What is claimed is:

1. An information processing apparatus, comprising:
   at least one memory configured to store program code; and
   electronic circuitry including at least one of a field programmable gate array (FPGA), an application specific integrated circuit (ASIC), and at least one processor, the at least one processor being configured to read and operate according to the program code, the electronic circuitry configured to:
   acquire a graph image;
   classify the graph image by graph type;
   generate, from the graph image, a probability map that is of a different type by the graph type using a single neural network;
   extract a component in the graph image based on the probability map;
   calculate a cost associated with component positions in the graph image;
   extract a value of the component of the graph image; and
   output the value of the component.

2. The information processing apparatus according to claim 1, wherein
   the single neural network has output channels different from each other by the graph type.

3. The information processing apparatus according to claim 2, wherein
   the single neural network has output channels of a plurality of different types for separating different components for each of graph types.

4. The information processing apparatus according to claim 1, wherein
   extracting the component extracts the component and traces a graph.

5. The information processing apparatus according to claim 4, wherein
   outputting outputs the traced graph with the value of the component, being appended to the traced graph.

6. The information processing apparatus according to claim 4, wherein
   extracting the component simultaneously traces a plurality of components in the graph image.

7. The information processing apparatus according to claim 4, wherein
   extracting the component calculates, using a first probability map for a line graph, a first cost between adjacent X-coordinate positions of a graph image of the line graph, and traces the line graph such that a sum of the first costs for a plurality of line graphs is minimized.

8. The information processing apparatus according to claim 7, wherein
   extracting the component uses a Linear Programming (LP) to calculate the first cost of the line graph to be traced.

9. The information processing apparatus according to claim 8, wherein
   extracting the component has an occlusion flag indicating whether or not the line graph to be traced is occluded by another line graph at each of X-coordinate positions, and calculates the first cost of the line graph to be traced using the occlusion flag.

10. The information processing apparatus according to claim 9, wherein
    the occlusion flag is provided for each of a plurality of line graphs and holds a status of each of the plurality of line graphs at each of the X-coordinate positions.

11. The information processing apparatus according to claim 7, wherein
extracting the component detects a start point and an end point of the line graph by adding up existence probabilities of the line graph in a Y-coordinate axis direction at each of the X-coordinate positions using the first type of probability map, and traces the line graph from the detected start point to the detected end point.

12. The information processing apparatus according to claim 4, wherein
extracting the component traces the graph by concatenating adjacent pixels using a second type of probability map for a graph other than a line graph.

13. The information processing apparatus according to claim 12, wherein
extracting the component uses a Connected Component Analysis (CCA) to concatenate adjacent pixels in a graph image of the graph.

14. The information processing apparatus according to claim 12, wherein
extracting the component corrects the extracted components by referring to the second type of probability map.

15. The information processing apparatus according to claim 1, wherein
extracting the component uses a first type of probability map for a line graph to calculates a second cost of each pixel in a graph image of the line graph, and traces the line graph on a pixel where a sum of the second costs for a plurality of line graphs is minimized.

16. The information processing apparatus according to claim 15, wherein
extracting the component uses a Dynamic Programming (DP) to calculate the second cost of each pixel of the graph image of the line graph.

17. The information processing apparatus according to claim 15, wherein
extracting the component calculates the second cost by evaluating at least one of smoothness of a line of the line graph and consistency of a line color or a line type of the line graph.

18. The information processing apparatus according to claim 1, wherein
generating the probability map generates a probability map for extracting tick-marks of graph axes, and
outputting the value extracts the value of the component of the graph image based on the probability map for extracting the tick-marks of the graph axes.

19. An information processing method, performed by at least one processor and comprising:
acquiring a graph image;
classifying the graph image by graph type;
generating, from the graph image, a probability map that is of a different type by the graph type using a single neural network;
extracting a component in the graph image based on the probability map;
calculating a cost associated with component positions in the graph image;
extracting a value of the component of the graph image; and
outputting the value of the component.

20. A non-transitory computer-readable information storage medium for storing a program that when executed by at least one processor, causes the at least one processor to:
acquire a graph image;
classify the graph image acquired by the graph image acquisition process by graph type;
generate, from the graph image, a probability map that is of a different type by the graph type using a single neural network;
extract a component in the graph image based on the probability map generated by the probability map generation process;
calculate a cost associated with component positions in the graph image;
extract a value of the component of the graph image extracted by the component extraction process; and
output the value of the component extracted by the value extraction process.

* * * * *